(12) United States Patent
Thakur et al.

(10) Patent No.: US 11,460,841 B2
(45) Date of Patent: Oct. 4, 2022

(54) REMOTE OPERATION EXTENDING AN EXISTING ROUTE TO A DESTINATION

(71) Applicants: Nissan North America, Inc., Franklin, TN (US); United States of America as Represented by the Administrator of NASA, Washington, DC (US); Renault S.A.S., Boulogne-Billancourt (FR)

(72) Inventors: Siddharth Thakur, Paris (FR); Armelle Guerin, Woodside, CA (US); Atsuhide Kobashi, Sunnyvale, CA (US); Julius S. Gyorfi, Vernon Hills, IL (US); Mark B. Allan, Campbell, CA (US)

(73) Assignees: Nissan North America, Inc., Franklin, TN (US); United States of America as Represented by the Administrator of NASA, Washington, DC (US); Renault S.A.S., Boulogne-Billancourt (FR)

( * ) Notice: Subject to any disclaimer, the term of this patent is extended or adjusted under 35 U.S.C. 154(b) by 57 days.

(21) Appl. No.: 16/969,080

(22) PCT Filed: Feb. 21, 2019

(86) PCT No.: PCT/US2019/019037
§ 371 (c)(1),
(2) Date: Aug. 11, 2020

(87) PCT Pub. No.: WO2019/165135
PCT Pub. Date: Aug. 29, 2019

(65) Prior Publication Data
US 2021/0034050 A1  Feb. 4, 2021

Related U.S. Application Data

(60) Provisional application No. 62/633,414, filed on Feb. 21, 2018.

(51) Int. Cl.
*G05D 1/00* (2006.01)
*H04W 4/024* (2018.01)
(Continued)

(52) U.S. Cl.
CPC .......... *G05D 1/0022* (2013.01); *B60W 50/14* (2013.01); *B60W 60/001* (2020.02);
(Continued)

(58) Field of Classification Search
CPC ............... G05D 1/0022; G05D 1/0044; G05D 2201/0213; B60W 50/14; B60W 60/001;
(Continued)

(56) References Cited

U.S. PATENT DOCUMENTS

| 6,374,183 | B1* | 4/2002 | Oshida | G01C 21/3626 |
|---|---|---|---|---|
| | | | | 340/990 |
| 7,751,969 | B2* | 7/2010 | Jung | G01C 21/3647 |
| | | | | 701/436 |

(Continued)

OTHER PUBLICATIONS

Satellite Imagine Corporation, "Satellite Images, Satellite Map", Archived on Aug. 10, 2017, Accessed Apr. 7, 2022, https://web.archive.org/web/20170810215001/http://www.satimagingcorp.com/gallery/high-resolution/ (Year: 2017).*

(Continued)

*Primary Examiner* — Hunter B Lonsberry
*Assistant Examiner* — Harrison Heflin
(74) *Attorney, Agent, or Firm* — Young Basile Hanlon & MacFarlane, P.C.

(57) ABSTRACT

An apparatus for remote support of autonomous operation of a vehicle includes a processor that is configured to perform a method including receiving, from a vehicle traversing a driving route from a start point to an end point at a destination, an assistance request signal identifying an inability of the vehicle at the destination to reach the end (Continued)

point, generating a first map display including a representation of a geographical area and the vehicle within the geographical area, receiving, from the vehicle, sensor data from one or more sensing devices of the vehicle, generating a remote support interface including the first map display and the sensor data, and transmitting instruction data to the vehicle that includes an alternative end point at the destination responsive to an input signal provided to the remote support interface.

18 Claims, 19 Drawing Sheets

(51) Int. Cl.
  *H04W 4/48* (2018.01)
  *B60W 60/00* (2020.01)
  *G01C 21/00* (2006.01)
  *B60W 50/14* (2020.01)
  *G01C 21/34* (2006.01)
(52) U.S. Cl.
  CPC ..... *G01C 21/3461* (2013.01); *G01C 21/3815* (2020.08); *G01C 21/3848* (2020.08); *G05D 1/0044* (2013.01); *H04W 4/024* (2018.02); *H04W 4/48* (2018.02); *B60W 2050/146* (2013.01)
(58) Field of Classification Search
  CPC ......... B60W 2050/146; G01C 21/3815; G01C 21/3848; G01C 21/3415; G01C 21/362; G01C 21/3461; G01C 21/3438; H04W 4/024; H04W 4/48
  See application file for complete search history.

(56) References Cited

U.S. PATENT DOCUMENTS

| | | | |
|---|---|---|---|
| 8,860,787 B1* | 10/2014 | Neven | H04N 7/152 348/46 |
| 2003/0030398 A1 | 2/2003 | Jacobs et al. | |
| 2007/0112461 A1 | 5/2007 | Zini et al. | |
| 2011/0213551 A1* | 9/2011 | Shioda | G01C 21/3423 701/533 |
| 2012/0072052 A1* | 3/2012 | Powers | G05D 1/024 701/2 |
| 2013/0050131 A1* | 2/2013 | Lee | G08G 1/09626 345/174 |
| 2015/0248131 A1* | 9/2015 | Fairfield | G05D 1/0011 701/2 |
| 2016/0342946 A1 | 11/2016 | Herraiz Herraiz | |
| 2017/0132934 A1 | 5/2017 | Kentley et al. | |
| 2017/0192423 A1* | 7/2017 | Rust | G05D 1/0238 |
| 2018/0004214 A1 | 1/2018 | Wisniowski et al. | |
| 2018/0058863 A1* | 3/2018 | Meyer | G01C 21/3614 |
| 2019/0017839 A1* | 1/2019 | Eyler | G01C 21/3638 |
| 2019/0122322 A1* | 4/2019 | Perez | G06F 16/903 |
| 2019/0179305 A1* | 6/2019 | Magzimof | G05D 1/0038 |
| 2019/0196503 A1* | 6/2019 | Abari | G06Q 10/00 |

OTHER PUBLICATIONS

Dictionary.com, "High-Resolution", Archived on Jan. 30, 2018, Accessed Apr. 11, 2022, https://web.archive.org/web/20180130025713/ https://www.dictionary.com/browse/high-resolution (Year: 2018).*

* cited by examiner

REMOTE OPERATION EXTENDING AN EXISTING ROUTE TO A DESTINATION

CROSS-REFERENCE TO RELATED APPLICATION(S)

This application is a national stage 371 filing of International Application Serial No. PCT/US2019/019037, filed Feb. 21, 2019, which claims priority to and the benefit of U.S. Provisional Application Patent Ser. No. 62/633,414, filed Feb. 21, 2018, the entire disclosure of which is hereby incorporated by reference.

TECHNICAL FIELD

This application relates to vehicle interfaces for autonomous vehicle monitoring, including methods, apparatuses, systems, and non-transitory computer readable media for the remote monitoring and tele-operation of autonomous vehicles.

BACKGROUND

Increasing autonomous vehicle usage creates the potential for more efficient movement of passengers and cargo through a transportation network. Moreover, the use of autonomous vehicles can result in improved vehicle safety and more effective communication between vehicles. However, autonomous vehicles often encounter situations where they have arrived at a destination, but the defined end point is not available. This can limit the utility of autonomous vehicles.

SUMMARY

Disclosed herein are aspects, features, elements, implementations, and implementations for remote support of autonomous operation of a vehicle. The implementations support remote operation that extends an existing route to alternative end point at a destination.

An aspect of the disclosed implementations includes an apparatus for remote support of autonomous operation of vehicles. The apparatus includes a memory and a processor. The processor may be configured to execute instructions stored in the memory to receive, from a vehicle traversing a driving route from a start point to an end point at a destination, an assistance request signal identifying an inability of the vehicle at the destination to reach the end point, generate a first map display including a representation of a geographical area and the vehicle within the geographical area, receive, from the vehicle, sensor data from one or more sensing devices of the vehicle, generate a remote support interface including the first map display and the sensor data, and transmit instruction data to the vehicle that includes an alternative end point at the destination responsive to an input signal provided to the remote support interface.

An aspect of the disclosed implementations includes a method for providing remote support of autonomous operation of a vehicle. The method can include receiving, from a vehicle traversing a driving route from a start point to an end point at a destination, an assistance request signal identifying an inability of the vehicle at the destination to reach the end point, generating a first map display including a representation of a geographical area and the vehicle within the geographical area, receiving, from the vehicle, sensor data from one or more sensing devices of the vehicle, generating a remote support interface including the first map display and the sensor data, and transmitting instruction data to the vehicle that includes an alternative end point at the destination responsive to an input signal provided to the remote support interface.

These and other aspects of the present disclosure are disclosed in the following detailed description of the embodiments, the appended claims and the accompanying figures.

BRIEF DESCRIPTION OF THE DRAWINGS

The disclosed technology is best understood from the following detailed description when read in conjunction with the accompanying drawings. It is emphasized that, according to common practice, the various features of the drawings may not be to-scale. On the contrary, the dimensions of the various features may be arbitrarily expanded or reduced for clarity. Further, like reference numbers refer to like elements throughout the drawings unless otherwise noted.

DETAILED DESCRIPTION

An autonomous vehicle, whether or not it has a passenger that can intervene in its operation, may be performing a service that includes arriving at a destination. The service may be a taxiing operation or shuttle operation, such as the pick-up or drop-off of a passenger, or may be a delivery operation, such as the pick-up or drop-off of a package. The route to the destination is associated with an end point at the destination.

For example, the end point may be a set of Global Positioning Satellite (GPS) coordinates associated with the address of the destination, such as a main entrance, a secondary entrance, a defined pick-up or drop-off zone, a particular loading dock, etc. Various situations may arise where the vehicle reaches the destination (e.g., within a defined range of the destination), but is unable to reach the end point. For example, an entrance may be closed, a sidewalk may be closed, a door may be inaccessible, etc.

The utility of autonomous vehicles may be increased by using a remote operation to extend an existing route to a destination, and more particularly to an alternative end point at the destination. This assistance can allow the vehicle to achieve its service objective. Further, by tracking information related to alternative end points for various destinations, the efficiency of the transportation network overall may be improved.

To describe some implementations of the teachings herein in greater detail, reference is first made to the environment in which this disclosure may be implemented.

Figure 1:
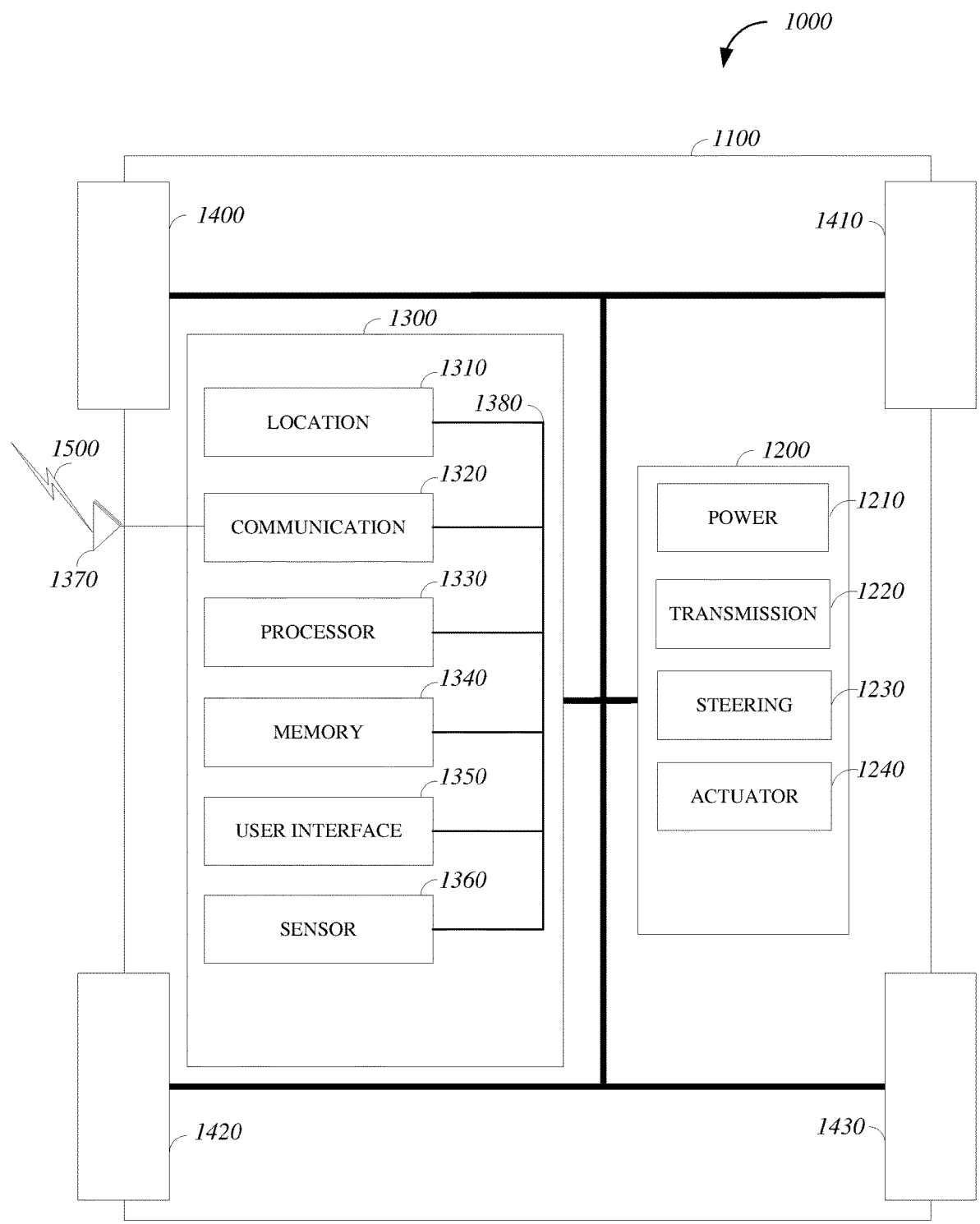
FIG. 1 is a diagram of an example of a portion of a vehicle in which the aspects, features, and elements disclosed herein may be implemented.

FIG. 1 is a diagram of an example of a vehicle 1000 in which the aspects, features, and elements disclosed herein may be implemented. The vehicle 1000 includes a chassis 1100, a powertrain 1200, a controller 1300, wheels 1400/1410/1420/1430, or any other element or combination of elements of a vehicle. Although the vehicle 1000 is shown as including four wheels 1400/1410/1420/1430 for simplicity, any other propulsion device or devices, such as a propeller or tread, may be used. In FIG. 1, the lines interconnecting elements, such as the powertrain 1200, the controller 1300, and the wheels 1400/1410/1420/1430, indicate that information, such as data or control signals, power, such as electrical power or torque, or both information and power, may be communicated between the respective elements. For example, the controller 1300 may receive power from the powertrain 1200 and communicate with the powertrain 1200, the wheels 1400/1410/1420/1430, or both, to control the vehicle 1000, which can include accelerating, decelerating, steering, or otherwise controlling the vehicle 1000.

The powertrain 1200 includes a power source 1210, a transmission 1220, a steering unit 1230, a vehicle actuator 1240, or any other element or combination of elements of a powertrain, such as a suspension, a drive shaft, axles, or an exhaust system. Although shown separately, the wheels 1400/1410/1420/1430 may be included in the powertrain 1200.

The power source 1210 may be any device or combination of devices operative to provide energy, such as electrical energy, thermal energy, or kinetic energy. For example, the power source 1210 includes an engine, such as an internal combustion engine, an electric motor, or a combination of an internal combustion engine and an electric motor, and is operative to provide kinetic energy as a motive force to one or more of the wheels 1400/1410/1420/1430. In some embodiments, the power source 1210 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 receives energy, such as kinetic energy, from the power source 1210, and transmits the energy to the wheels 1400/1410/1420/1430 to provide a motive force. The transmission 1220 may be controlled by the controller 1300, the vehicle actuator 1240 or both. The steering unit 1230 may be controlled by the controller 1300, the vehicle actuator 1240, or both and controls the wheels 1400/1410/1420/1430 to steer the vehicle. The vehicle actuator 1240 may receive signals from the controller 1300 and may actuate or control the power source 1210, the transmission 1220, the steering unit 1230, or any combination thereof to operate the vehicle 1000.

In the illustrated embodiment, the controller 1300 includes a location unit 1310, an electronic communication unit 1320, a processor 1330, a memory 1340, a user interface 1350, a sensor 1360, and an electronic communication interface 1370. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof can be integrated in one or more electronic units, circuits, or chips.

In some embodiments, the processor 1330 includes any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively coupled with the memory 1340 via a communication bus 1380.

The processor 1330 may be configured to execute instructions including instructions for remote operation which may be used to operate the vehicle 1000 from a remote location including the operations center. The instructions for remote operation may be stored in the vehicle 1000 or received from an external source such as a traffic management center, or server computing devices, which may include cloud based server computing devices.

The memory 1340 may include any tangible non-transitory computer-usable or computer-readable medium, capable of, for example, containing, storing, communicating, or transporting machine readable instructions or any information associated therewith, for use by or in connection with the processor 1330. The memory 1340 is, for example, one or more solid state drives, one or more memory cards, one or more removable media, one or more read only memories (ROM), one or more random access memories (RAM), one or more random access memories (RAM), one or more registers, low power double data rate (LPDDR) memories, one or more cache memories, one or more disks, including a hard disk, a floppy disk, an optical disk, a magnetic or optical card, or any type of non-transitory media suitable for storing electronic information, or any combination thereof.

The electronic communication interface 1370 may be a wireless antenna, as shown, a wired communication port, an optical communication port, or any other wired or wireless unit capable of interfacing with a wired or wireless electronic communication medium 1500.

The electronic communication unit 1320 may be configured to transmit or receive signals via the wired or wireless electronic communication medium 1500, such as via the electronic communication interface 1370. Although not explicitly shown in FIG. 1, the electronic communication unit 1320 is configured to transmit, receive, or both via any wired or wireless communication medium, such as radio frequency (RF), ultra violet (UV), visible light, fiber optic, wire line, or a combination thereof. Although FIG. 1 shows a single one of the electronic communication unit 1320 and a single one of the electronic communication interface 1370, any number of communication units and any number of communication interfaces may be used. In some embodiments, the electronic communication unit 1320 can include a dedicated short range communications (DSRC) unit, a wireless safety unit (WSU), IEEE 802.11p (Wifi-P), or a combination thereof.

The location unit 1310 may determine geolocation information, including but not limited to longitude, latitude, elevation, direction of travel, or speed, of the vehicle 1000. For example, the location unit includes a global positioning system (GPS) unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 may include any unit capable of being used as an interface by a person, including any of a virtual keypad, a physical keypad, a touchpad, a display, a touchscreen, a speaker, a microphone, a video camera, a sensor, and a printer. The user interface 1350 may be operatively coupled with the processor 1330, as shown, or with any other element of the controller 1300. Although shown as a single unit, the user interface 1350 can include one or more physical units. For example, the user interface 1350 includes an audio interface for performing audio communication with a person, and a touch display for performing visual and touch based communication with the person.

The sensor 1360 may include one or more sensors, such as an array of sensors, which may be operable to provide information that may be used to control the vehicle. The sensor 1360 can provide information regarding current operating characteristics of the vehicle or its surrounding. The sensor 1360 included, for example, a speed sensor, acceleration sensors, a steering angle sensor, traction-related sensors, braking-related sensors, or any sensor, or combination of sensors, that is operable to report information regarding some aspect of the current dynamic situation of the vehicle 1000.

In some embodiments, the sensor 1360 includes sensors that are operable to obtain information regarding the physical environment surrounding the vehicle 1000. For example, one or more sensors detect road geometry and obstacles, such as fixed obstacles, vehicles, cyclists, and pedestrians. The sensor 1360 can be or include one or more video cameras, laser-sensing systems, infrared-sensing systems, acoustic-sensing systems, or any other suitable type of on-vehicle environmental sensing device, or combination of devices, now known or later developed. The sensor 1360 and the location unit 1310 may be combined.

Although not shown separately, the vehicle 1000 may include a trajectory controller. For example, the controller 1300 may include a trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller outputs signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400/1410/1420/1430, or both. The optimized trajectory can be control inputs such as a set of steering angles, with each steering angle corresponding to a point in time or a position. The optimized trajectory can be one or more paths, lines, curves, or a combination thereof.

One or more of the wheels 1400/1410/1420/1430 may be a steered wheel, which is pivoted to a steering angle under control of the steering unit 1230, a propelled wheel, which is torqued to propel the vehicle 1000 under control of the transmission 1220, or a steered and propelled wheel that steers and propels the vehicle 1000.

A vehicle may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 2:
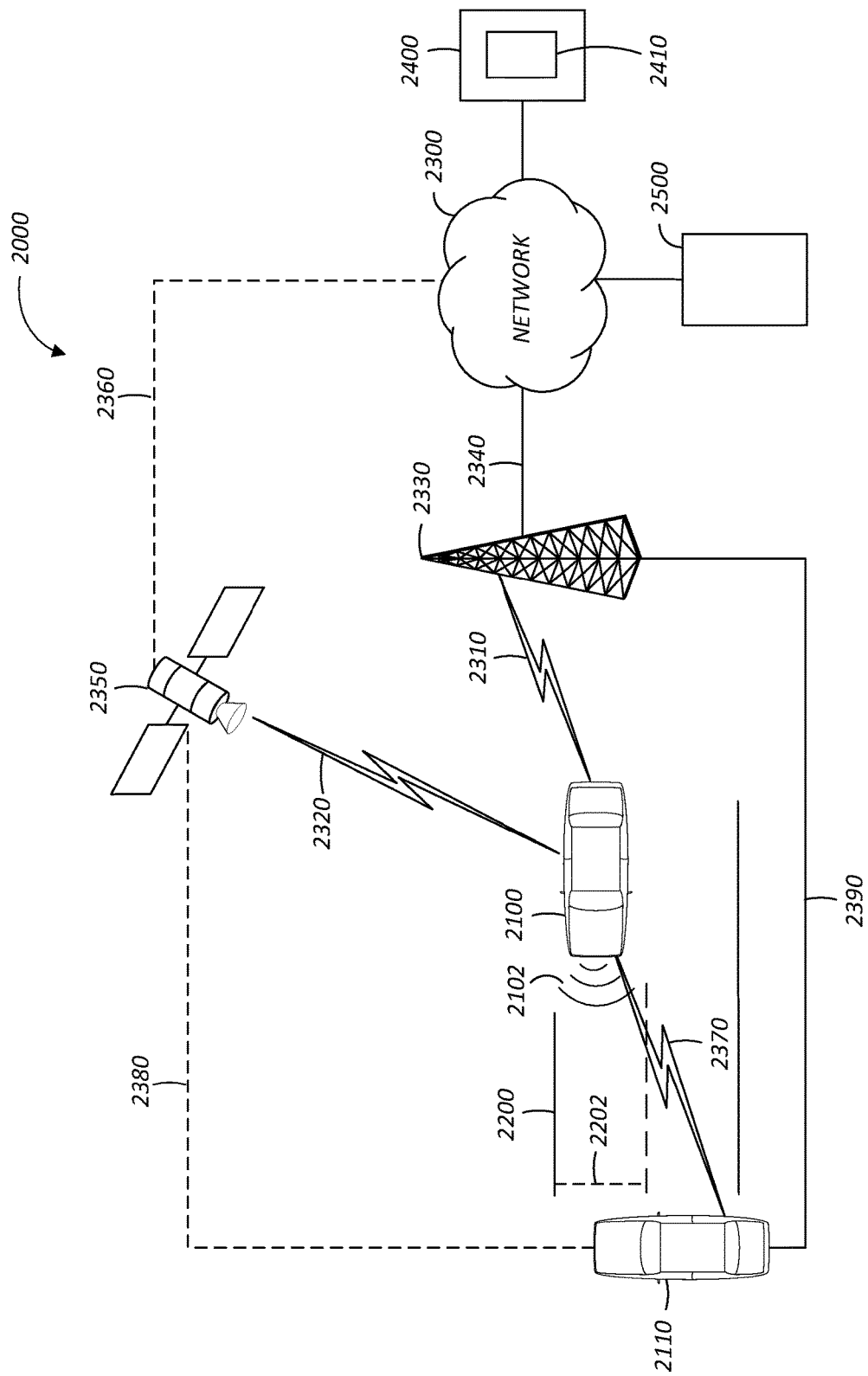
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system 2000 in which the aspects, features, and elements disclosed herein may be implemented. The vehicle transportation and communication system 2000 includes a vehicle 2100, such as the vehicle 1000 shown in FIG. 1, and one or more external objects, such as an external object 2110, which can include any form of transportation, such as the vehicle 1000 shown in FIG. 1, a pedestrian, cyclist, as well as any form of a structure, such as a building. The vehicle 2100 may travel via one or more portions of a transportation network 2200, and may communicate with the external object 2110 via one or more of an electronic communication network 2300. Although not explicitly shown in FIG. 2, a vehicle may traverse an area that is not expressly or completely included in a transportation network, such as an off-road area. In some embodiments the transportation network 2200 may include one or more of a vehicle detection sensor 2202, such as an inductive loop sensor, which may be used to detect the movement of vehicles on the transportation network 2200.

The electronic communication network 2300 may be a multiple access system that provides for communication, such as voice communication, data communication, video communication, messaging communication, or a combination thereof, between the vehicle 2100, the external object 2110, and an operations center 2400. For example, the vehicle 2100 or the external object 2110 may receive information, such as information representing the transportation network 2200, from the operations center 2400 via the electronic communication network 2300.

The operations center 2400 includes a controller apparatus 2410 which includes some or all of the features of the controller 1300 shown in FIG. 1. The controller apparatus 2410 can monitor and coordinate the movement of vehicles, including autonomous vehicles. The controller apparatus 2410 may monitor the state or condition of vehicles, such as the vehicle 2100, and external objects, such as the external object 2110. The controller apparatus 2410 can receive vehicle data and infrastructure data including any of: vehicle velocity; vehicle location; vehicle operational state; vehicle destination; vehicle route; vehicle sensor data; external object velocity; external object location; external object operational state; external object destination; external object route; and external object sensor data.

Further, the controller apparatus 2410 can establish remote control over one or more vehicles, such as the vehicle 2100, or external objects, such as the external object 2110. In this way, the controller apparatus 2410 may teleoperate the vehicles or external objects from a remote location. The controller apparatus 2410 may exchange (send or receive) state data with vehicles, external objects, or computing devices such as the vehicle 2100, the external object 2110, or a server computing device 2500, via a wireless communication link such as the wireless communication link 2380 or a wired communication link such as the wired communication link 2390.

The server computing device 2500 may include one or more server computing devices which may exchange (send or receive) state signal data with one or more vehicles or computing devices including the vehicle 2100, the external object 2110, or the operations center 2400, via the electronic communication network 2300.

In some embodiments, the vehicle 2100 or the external object 2110 communicates via the wired communication link 2390, a wireless communication link 2310/2320/2370, or a combination of any number or types of wired or wireless communication links. For example, as shown, the vehicle 2100 or the external object 2110 communicates via a terrestrial wireless communication link 2310, via a non-terrestrial wireless communication link 2320, or via a combination thereof. In some implementations, a terrestrial wireless communication link 2310 includes an Ethernet link, a serial link, a Bluetooth link, an infrared (IR) link, an ultraviolet (UV) link, or any link capable of electronic communication.

A vehicle, such as the vehicle 2100, or an external object, such as the external object 2110 may communicate with another vehicle, external object, or the operations center 2400. For example, a host, or subject, vehicle 2100 may receive one or more automated inter-vehicle messages, such as a basic safety message (BSM), from the operations center 2400, via a direct communication link 2370, or via an electronic communication network 2300. For example, operations center 2400 may broadcast the message to host vehicles within a defined broadcast range, such as three hundred meters, or to a defined geographical area. In some embodiments, the vehicle 2100 receives a message via a third party, such as a signal repeater (not shown) or another remote vehicle (not shown). In some embodiments, the vehicle 2100 or the external object 2110 transmits one or more automated inter-vehicle messages periodically based on a defined interval, such as one hundred milliseconds.

The vehicle 2100 may communicate with the electronic communication network 2300 via an access point 2330. The access point 2330, which may include a computing device, is configured to communicate with the vehicle 2100, with the electronic communication network 2300, with the operations center 2400, or with a combination thereof via wired or wireless communication links 2310/2340. For example, an access point 2330 is a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point can include any number of interconnected elements.

The vehicle 2100 may communicate with the electronic communication network 2300 via a satellite 2350, or other non-terrestrial communication device. The satellite 2350, which may include a computing device, may be configured to communicate with the vehicle 2100, with the electronic communication network 2300, with the operations center 2400, or with a combination thereof via one or more communication links 2320/2360. Although shown as a single unit, a satellite can include any number of interconnected elements.

The electronic communication network 2300 may be any type of network configured to provide for voice, data, or any other type of electronic communication. For example, the electronic communication network 2300 includes a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network can include any number of interconnected elements.

In some embodiments, the vehicle 2100 communicates with the operations center 2400 via the electronic communication network 2300, access point 2330, or satellite 2350. The operations center 2400 may include one or more computing devices, which are able to exchange (send or receive) data from vehicles such as the vehicle 2100, external objects including the external object 2110, or computing devices such as the server computing device 2500.

In some embodiments, the vehicle 2100 identifies a portion or condition of the transportation network 2200. For example, the vehicle 2100 may include one or more on-vehicle sensors 2102, such as the sensor 1360 shown in FIG. 1, which includes a speed sensor, a wheel speed sensor, a camera, a gyroscope, an optical sensor, a laser sensor, a radar sensor, a sonic sensor, or any other sensor or device or combination thereof capable of determining or identifying a portion or condition of the transportation network 2200.

The vehicle 2100 may traverse one or more portions of the transportation network 2200 using information communicated via the electronic communication network 2300, such as information representing the transportation network 2200, information identified by one or more on-vehicle sensors 2102, or a combination thereof. The external object 2110 may be capable of all or some of the communications and actions described above with respect to the vehicle 2100.

For simplicity, FIG. 2 shows the vehicle 2100 as the host vehicle, the external object 2110, the transportation network 2200, the electronic communication network 2300, and the operations center 2400. However, any number of vehicles, networks, or computing devices may be used. In some embodiments, the vehicle transportation and communication system 2000 includes devices, units, or elements not shown in FIG. 2.

Although the vehicle 2100 is shown communicating with the operations center 2400 via the electronic communication network 2300, the vehicle 2100 (and external object 2110) may communicate with the operations center 2400 via any number of direct or indirect communication links. For example, the vehicle 2100 or external object 2110 may communicate with the operations center 2400 via a direct communication link, such as a Bluetooth communication link. Although, for simplicity, FIG. 2 shows one of the transportation network 2200, and one of the electronic communication network 2300, any number of networks or communication devices may be used.

The external object 2110 is illustrated as a second, remote vehicle in FIG. 2. An external object is not limited to another vehicle. An external object may be any infrastructure element, e.g., a fence, a sign, a building, etc., that has the ability transmit data to the operations center 2400. The data may be, for example, sensor data from the infrastructure element.

Figure 3:
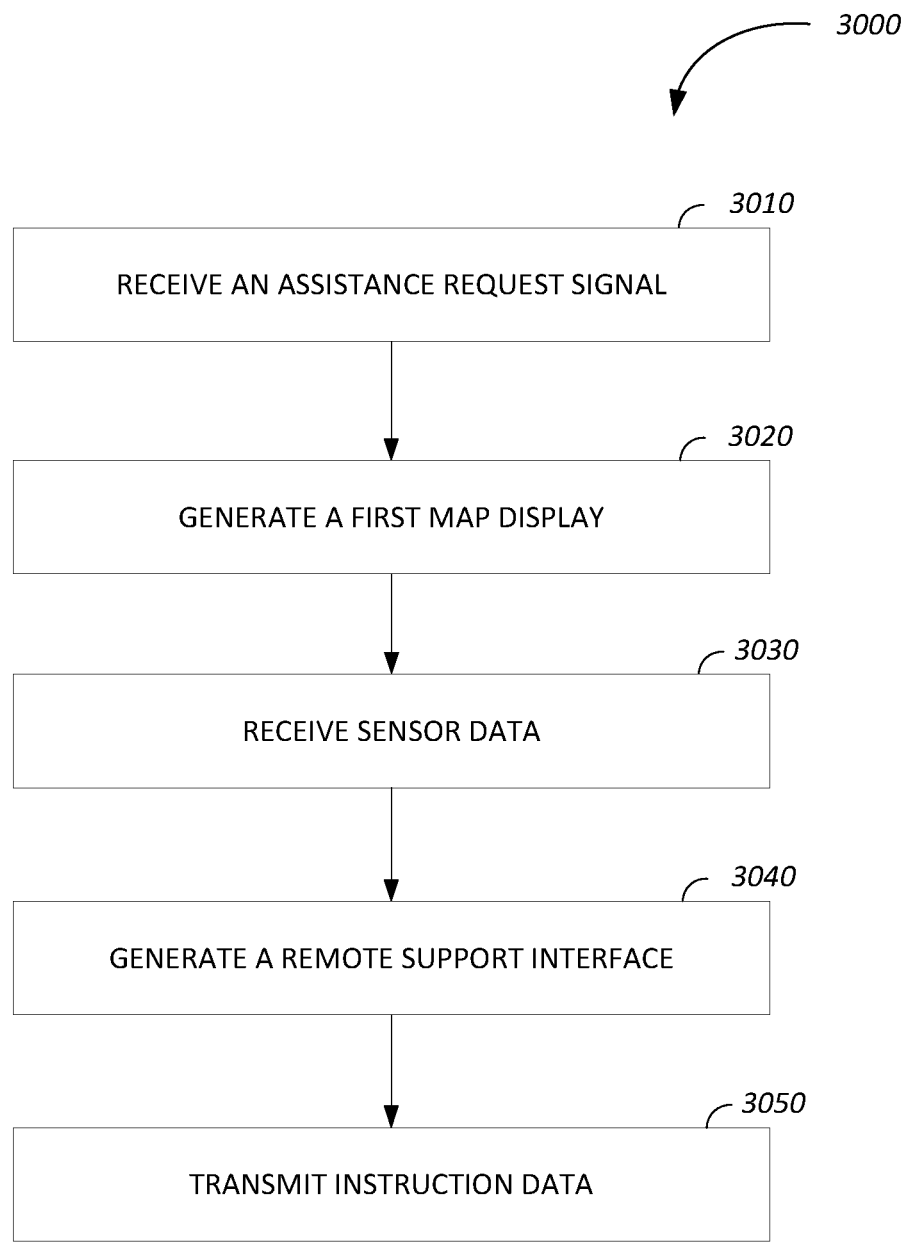
FIG. 3 is a flow chart diagram of a method for remote support of autonomous operation of a vehicle in accordance with the present disclosure.

FIG. 3 is a flow chart diagram of a method 3000 for remote support of autonomous operation of a vehicle in accordance with the present disclosure. The method 3000 may be utilized by a remote support system, such as a fleet manager or a vehicle manager implemented at the operations center 2400. Some or all aspects of the method 3000 may be implemented in a vehicle including the vehicle 1000 shown in FIG. 1, the vehicle 2100 shown in FIG. 2, or a computing apparatus including the controller apparatus 2410 shown in FIG. 2. In an implementation, some or all aspects of the method 3000 can be implemented in a system combining some or all of the features described in this disclosure.

At operation 3010, an assistance request signal is received from a vehicle. The vehicle can include a device or apparatus (e.g. a conveyance) that is used to transport objects including any of one or more passengers and cargo. The vehicle can include any of an autonomous vehicle or a vehicle that is driven by a human driver or a semi-autonomous vehicle. The vehicle is traversing a driving route from a start point to an end point at a destination, and the assistance request signal identifies an inability of the vehicle at the destination to reach the end point.

A destination may be a street address, a building name, or some other identifier of a location within a geographical area. The end point at the destination may be, for example, GPS coordinates or map coordinates. The end point may identify a particular entrance to the destination, or a particular point within the destination, such as a structure within a larger campus or a parking location within the destination. These terms may be further illustrated with reference to FIG. 4.

Figure 4:
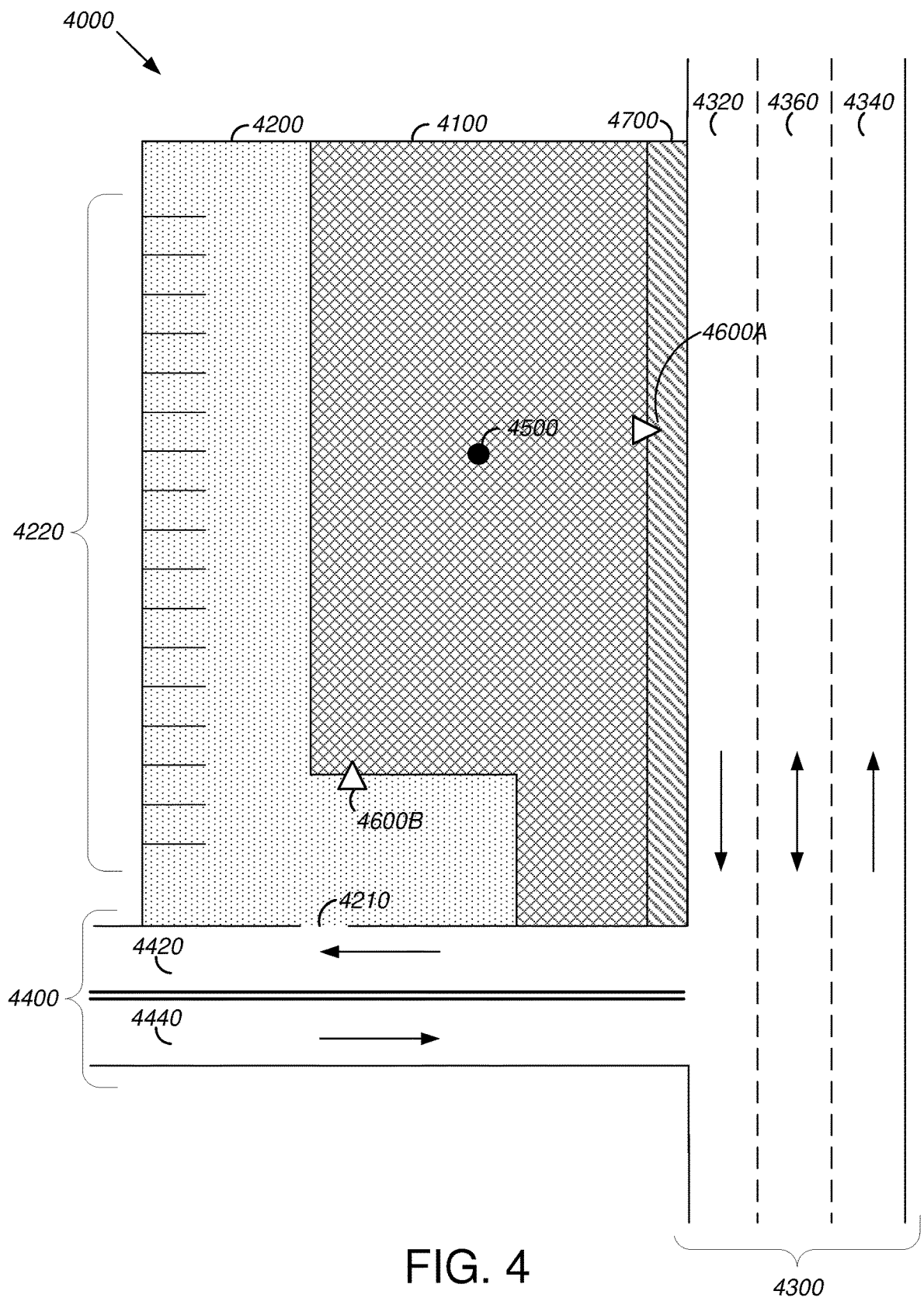
FIG. 4 is a diagram of a portion of a vehicle transportation network in accordance with this disclosure.

FIG. 4 is a diagram of a portion of a vehicle transportation network 4000 in accordance with this disclosure. A vehicle transportation network 4000 as shown includes one or more unnavigable areas, such as a building 4100, one or more partially navigable areas, such as parking area 4200, one or more navigable areas, such as roads 4300/4400, or a combination thereof. In some embodiments, an autonomous vehicle, such as the autonomous vehicle 1000 shown in FIG. 1 or the autonomous vehicle 2100 shown in FIG. 2, traverses a portion or portions of the vehicle transportation network 4000.

The vehicle transportation network may include one or more interchanges 4210 between one or more navigable, or partially navigable, areas 4200/4300/4400. For example, the portion of the vehicle transportation network shown in FIG. 4 includes an entrance or interchange 4210 between the parking area 4200 and road 4400. In some embodiments, the parking area 4200 may include parking slots 4220.

A portion of the vehicle transportation network, such as a road 4300/4400 may include one or more lanes 4320/4340/4360/4420/4440, and may be associated with one or more directions of travel, which are indicated by arrows in FIG. 4.

In some embodiments, a vehicle transportation network, or a portion thereof, such as the portion of the vehicle transportation network shown in FIG. 4, may be represented as vehicle transportation network information. For example, vehicle transportation network information may be expressed as a hierarchy of elements, such as markup language elements, that may be stored in a database or file. For simplicity, the figures herein depict vehicle transportation network information representing portions of a vehicle transportation network as diagrams or maps; however, vehicle transportation network information may be expressed in any computer-usable form capable of representing a vehicle transportation network, or a portion thereof. The vehicle transportation network information may include vehicle transportation network control information, such as direction of travel information, speed limit information, toll information, grade information, such as inclination or angle information, surface material information, aesthetic information, or a combination thereof.

A portion, or a combination of portions, of the vehicle transportation network may be identified as a point of interest or a destination. For example, the vehicle transportation network information may identify the building 4100 as a point of interest, an autonomous vehicle may identify the point of interest as a destination, and the autonomous vehicle may travel from an origin to the destination by traversing the vehicle transportation network.

In some embodiments, identifying a destination may include identifying a location of the destination, which may be a discrete uniquely identifiable geolocation, such as the geographic location 4500 for the building 4100. For example, the vehicle transportation network may include a defined location, such as a street address, a postal address, a vehicle transportation network address, a longitude and latitude, or a GPS address, for the destination.

In some embodiments, a destination may be associated with one or more end points, such as the entrance 4600A shown in FIG. 4. In some embodiments, the vehicle transportation network information may include defined or predicted end point location information, such as information identifying a geolocation of an end point associated with a destination. For example, the end point may be a street parking location adjacent to the destination, etc. The end point in this example may be an alternative entrance 4600B.

The vehicle transportation network may be associated with, or may include, a pedestrian transportation network. For example, FIG. 4 includes a portion 4700 of a pedestrian transportation network, which may be a pedestrian walkway. A pedestrian transportation network, or a portion thereof, such as the portion 4700 of the pedestrian transportation network shown in FIG. 4, may be represented as pedestrian transportation network information. In some embodiments, the vehicle transportation network information may include pedestrian transportation network information. A pedestrian transportation network may include pedestrian navigable areas. A pedestrian navigable area, such as a pedestrian walkway or a sidewalk, may correspond with a non-navigable area of a vehicle transportation network. Although not shown separately in FIG. 4, a pedestrian navigable area, such as a pedestrian crosswalk, may correspond with a navigable area, or a partially navigable area, of a vehicle transportation network.

In some embodiments, a parking area, such as the parking area 4200, is associated with a destination, such as the building 4100. For example, the vehicle transportation network information may include defined parking area information indicating that one or more parking areas are associated with a destination. In some embodiments, the vehicle transportation network information may omit information identifying the parking area 4200 or information associating the parking area 4200 with a destination. The parking area 4200 may be an unmapped portion of the geographical area represented by the map. An unmapped portion within the geographical area may be considered one without a path for a vehicle defined and/or one that has little or no internal data such that it is defined solely by or almost solely by its outer dimensions.

Referring again to FIG. 3, the assistance request signal received at operation 3010 can comprise an automated signal from the vehicle responsive to the vehicle stopping for a defined time within a defined distance of the destination. The assistance request signal may be responsive to a closed entrance at the destination between a current location of the vehicle and the end point, a closed sidewalk at the destination between the current location of the vehicle and the end point, or both. The assistance request signal may be generated responsive to a barrier to the end point. These situations that generate an assistance request signal may be determined from sensor data of the vehicle and/or from sensor data from infrastructure near the end point at the destination. As assistance request signal may be also be generated or initiated by a passenger of a vehicle, for example, when a drop-off is scheduled. An assistance request signal may be generated by a service workflow exception, such as a missed pick-up.

Figure 5A:
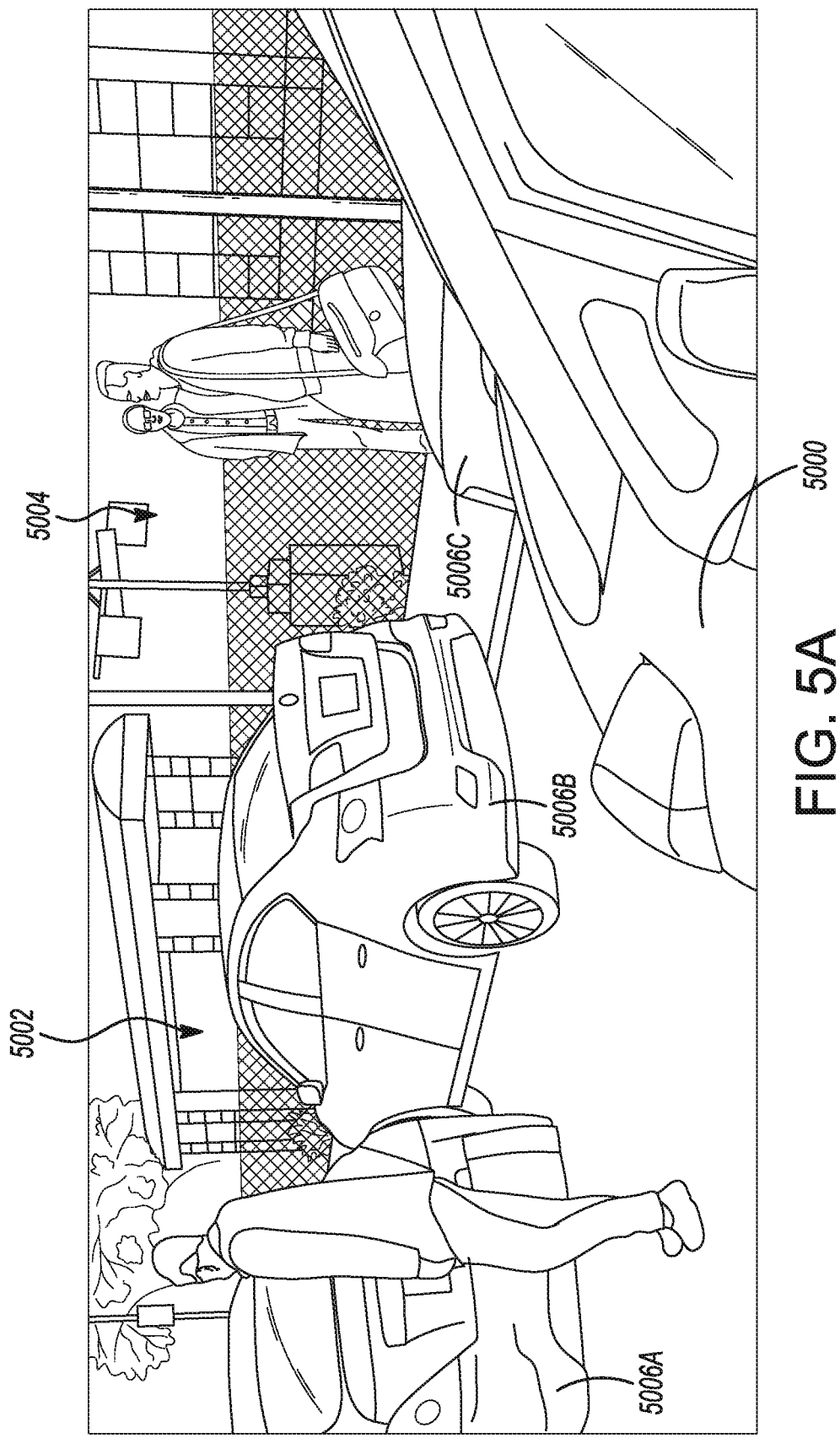
FIGS. 5A-5G are diagrams of a first example of remote operation extending an existing route to a destination.
Figure 5B:
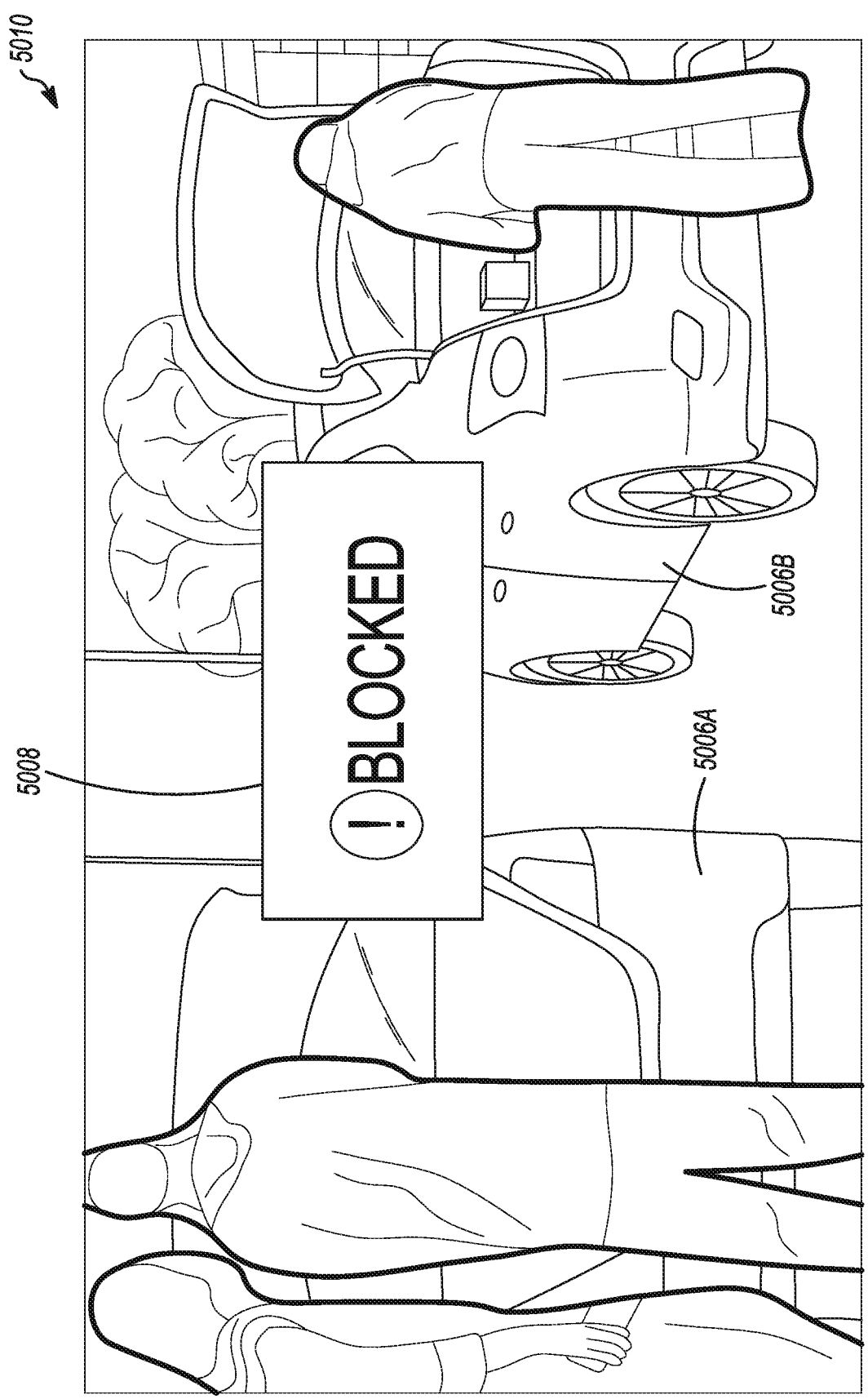

FIGS. 5A-5G and 6A-6H are diagrams of examples of remote operation extending an existing route to a destination. A first example of an assistance request signal received at operation 3010 may be illustrated by reference to FIGS. 5A and 5B. In FIG. 5A, a vehicle 5000 is traversing a driving route to an end point 5002 at a destination 5004 to pick up a passenger. The vehicle 5000 is prevented from reaching the end point 5002 by vehicles 5006A, 5006B, and 5006C, each in front of or beside the vehicle 5000. As can be seen in FIG. 5B, the vehicle 5000 is able to identify, using its image sensors, that the vehicle 5000 is blocked. In this example, a pop-up notice 5008 appears on the display 5010 of the vehicle 5000. The identification that the vehicle 5000 is blocked from the end point 5002 can generate the assistance request signal that identifies an inability of the vehicle at the destination 5004 to reach the end point 5002.

Figure 6A:
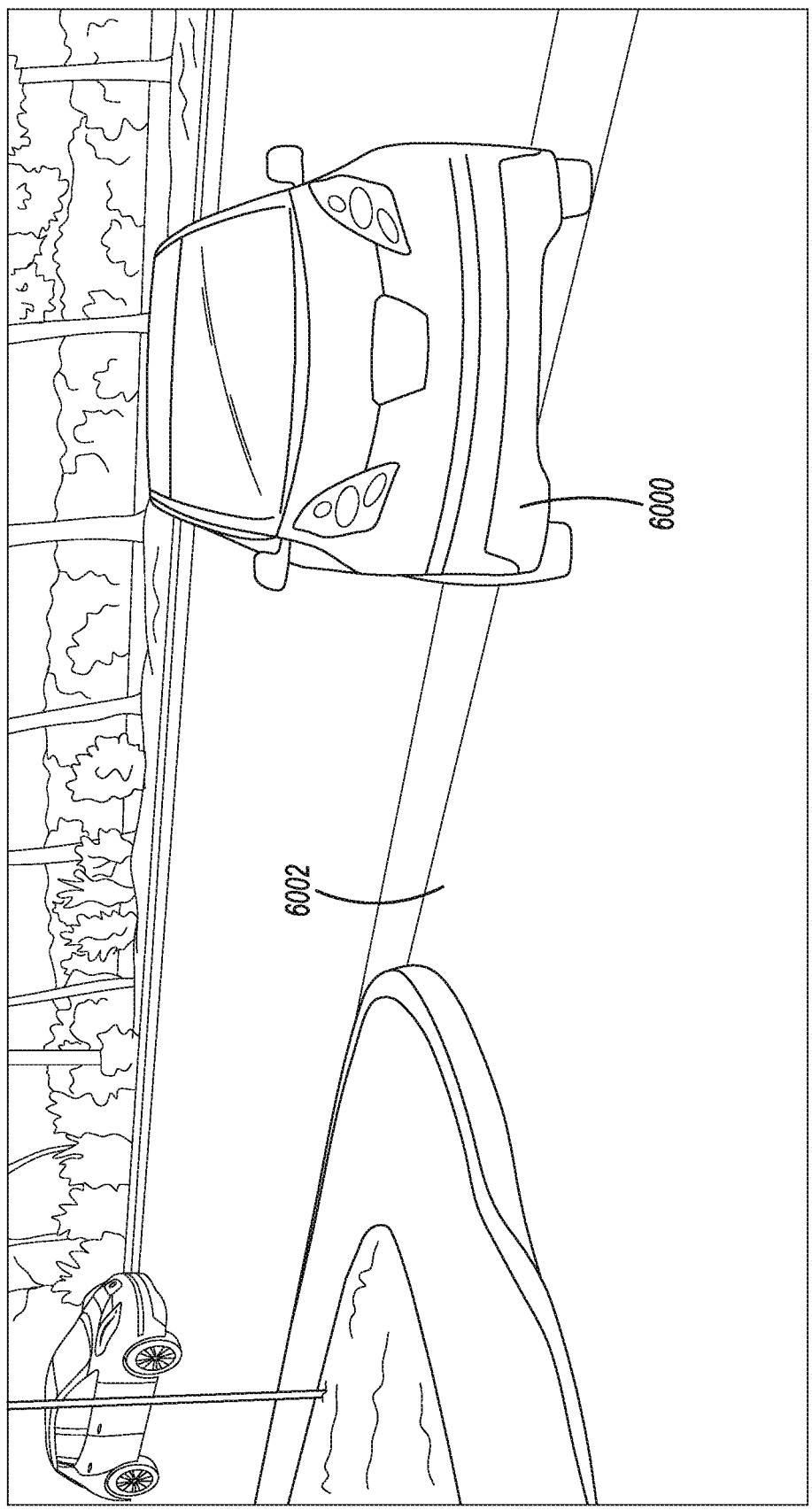
FIGS. 6A-6H are diagrams of a second example of remote operation extending an existing route to a destination.
Figure 6B:
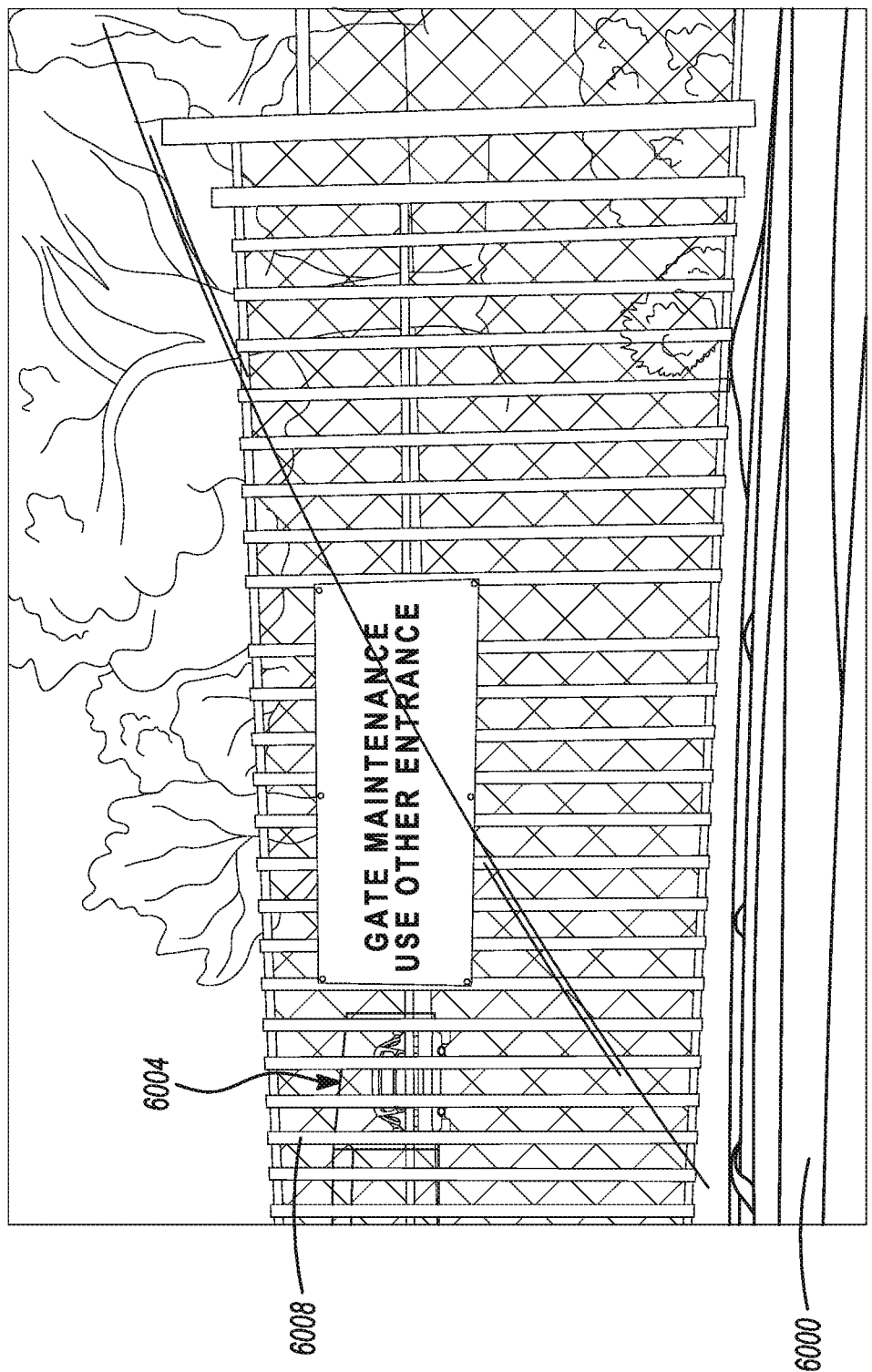

A second example of an assistance request signal received at operation 3010 may be illustrated by reference to FIGS. 6A and 6B. FIG. 6A is a drop-off scenario where a vehicle 6000 is turning into an entrance 6002 at a destination 6004 to reach an end point 6006 (see FIG. 6C). As can be seen in FIG. 6B, the vehicle 6000 is blocked from reaching the end point 6006. Specifically, the gate 6008 blocks the vehicle 6000 from reaching the end point 6006 at the destination 6004. An assistance request signal may be received by the remote support that identifies an inability of the vehicle 6000 at the destination 6004 to reach the end point 6006. The assistance request signal may be generated by the operator of the vehicle 6000, for example. The assistance request signal may be generated by the vehicle 6000 in response to sensors indicating that the gate 6008 is blocking the vehicle 6000 from reaching the end point 6006. The assistance request signal may be generated by the vehicle 6000 after a defined time passes with the vehicle 6000 stopped at the gate 6008.

Figure 5C:
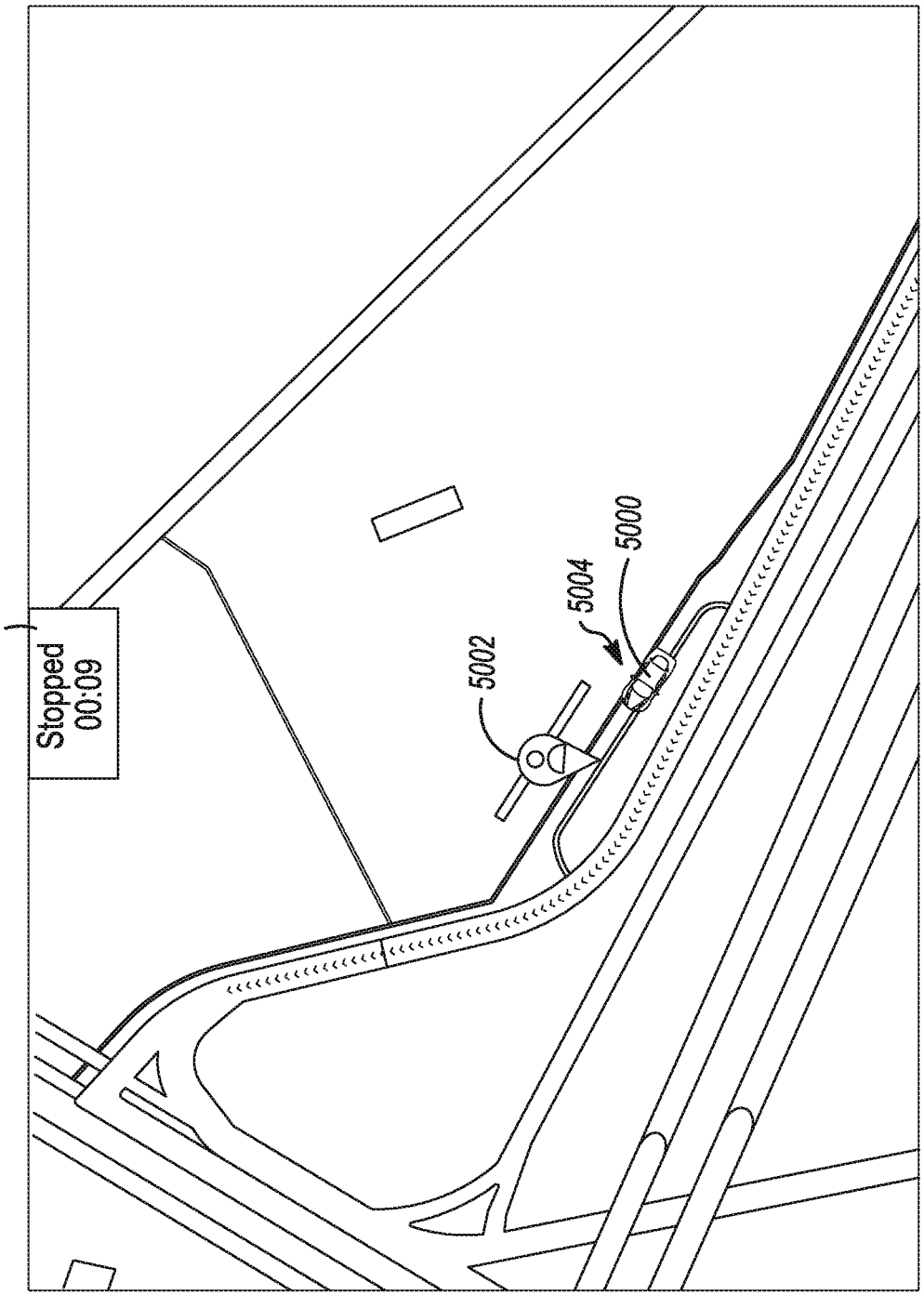
Figure 6C:
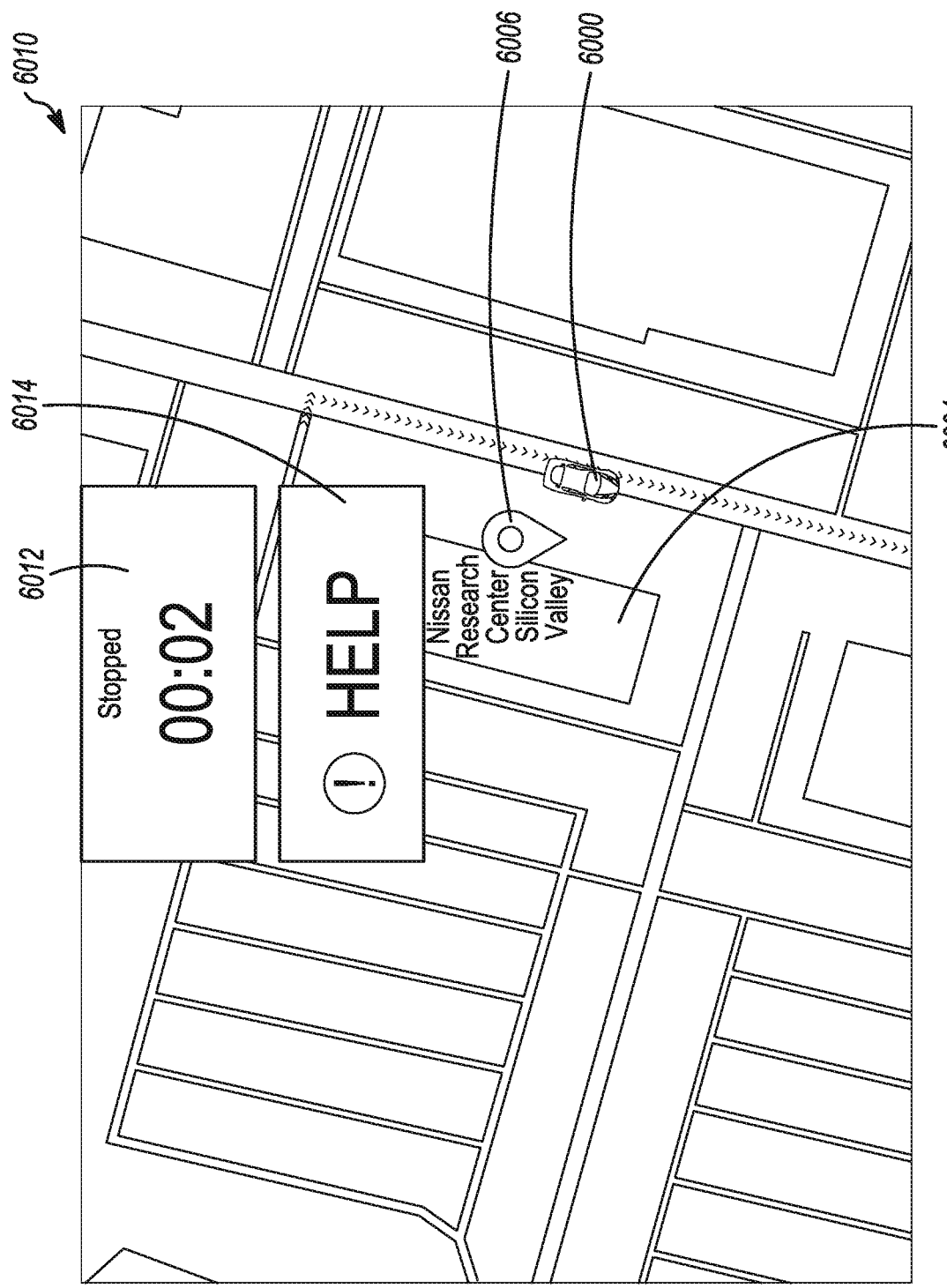

Referring again to FIG. 3, a first map display is generated at operation 3020. The first map display can include a representation of a geographical area and the vehicle within the geographical area as described with regards to the example of FIG. 4. FIG. 5C shows an example of a map display 5012 that includes the end point 5002 at the destination 5004. The vehicle 5000 is represented within the geographical area encompassed by the map display 5012. A timer 5014 on the display 5012 indicates how long the vehicle 5000 has been stopped at the destination 5004. FIG. 6C shows another example of a map display 6010 that includes the end point 6006 at the destination 6004. The vehicle 6000 is represented within the geographical area encompassed by the map display 6010. A timer 6012 on the display 6010 indicates how long the vehicle 6000 has been stopped by the gate 6008 at the destination 6004. Each of the timers 5014, 6012 may alternatively indicate how much time has passed since the remote support received the assistance request signal from vehicles 5000, 6000, respectively. FIG. 6C also indicates a pop-up notification 6014 of the receipt of the vehicle assistance signal.

At operation 3030, sensor data from the vehicle may be received from one or more sensing devices of the vehicle. The sensor data may include image data from an image capture device of the vehicle, object detection information from the vehicle, or both. The sensor data may include any other information available from a sensor device of the vehicle, or from (e.g., stationary) sensors within the geographical area about the vehicle.

Figure 5D:
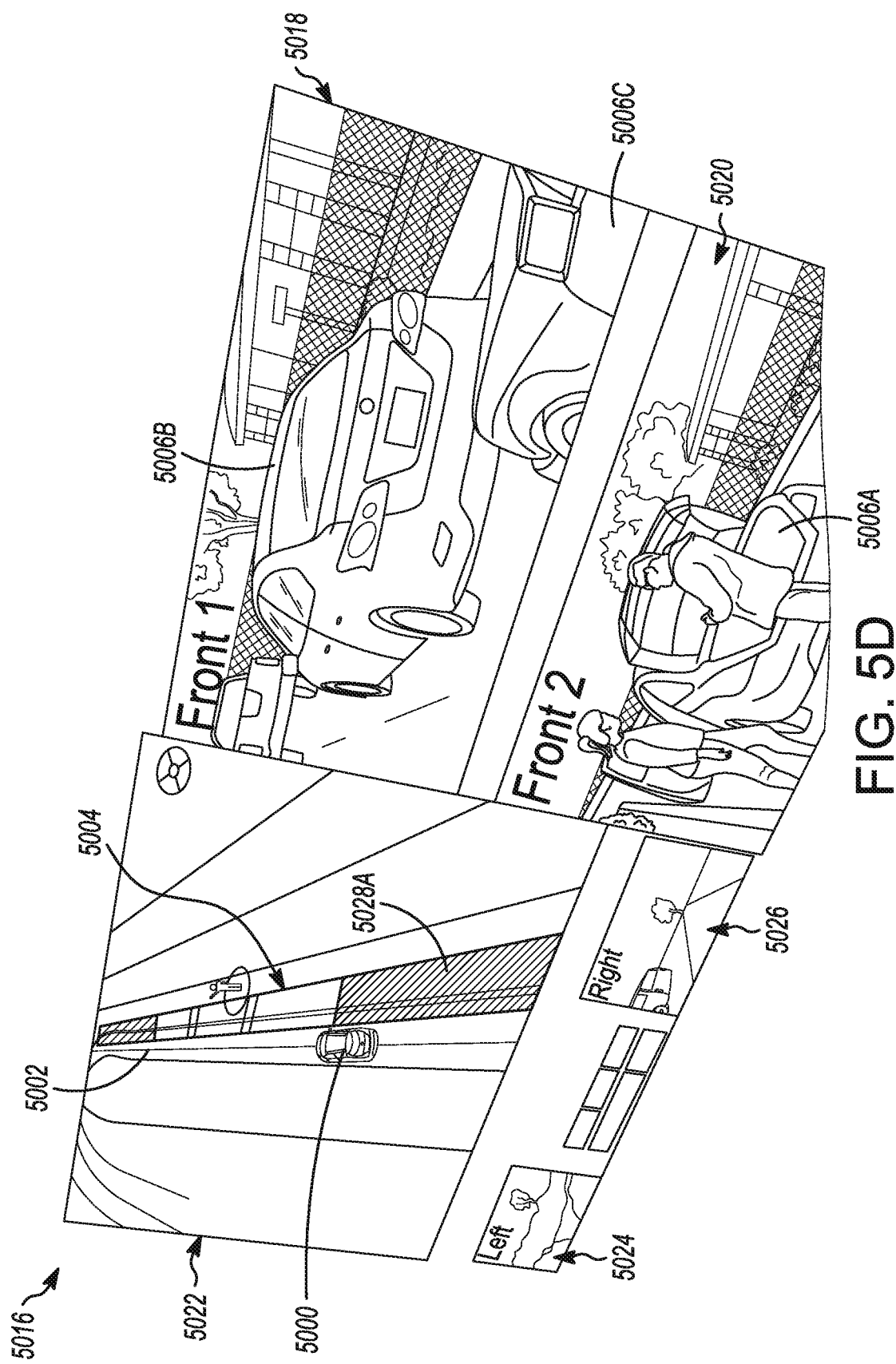

At operation 3040, a remote support interface is generated that includes one or more map displays and the sensor data. FIGS. 5C and 5D together illustrate one example of a remote support interface, which comprises the displays 5012 and 5016. FIG. 5C, described above, is an example of a map display 5012. FIG. 5D is a display 5016 that shows sensor data, in this example several camera views 5018, 5020 from the vehicle 5000. The remote support interface may also include data from one or more infrastructure sensor devices, local rules or norms overlaying the either of the displays, a georeferenced high resolution satellite image, or a combination of this information. FIG. 5D shows three satellite images 5022, 5024, 5026, for example. The local rules or norms may include, for example, a speed limit or an area where the vehicle should not drive. In FIG. 5D, for example, the cross-hatched area 5028A overlays the satellite image 5022 to either side of the destination 5004, indicating an area where the vehicle 5000 should not drive. Another area 5028B (see FIG. 5E) at the exit from the destination 5004 where the vehicle 5000 should not drive is also shown.

Figure 5E:
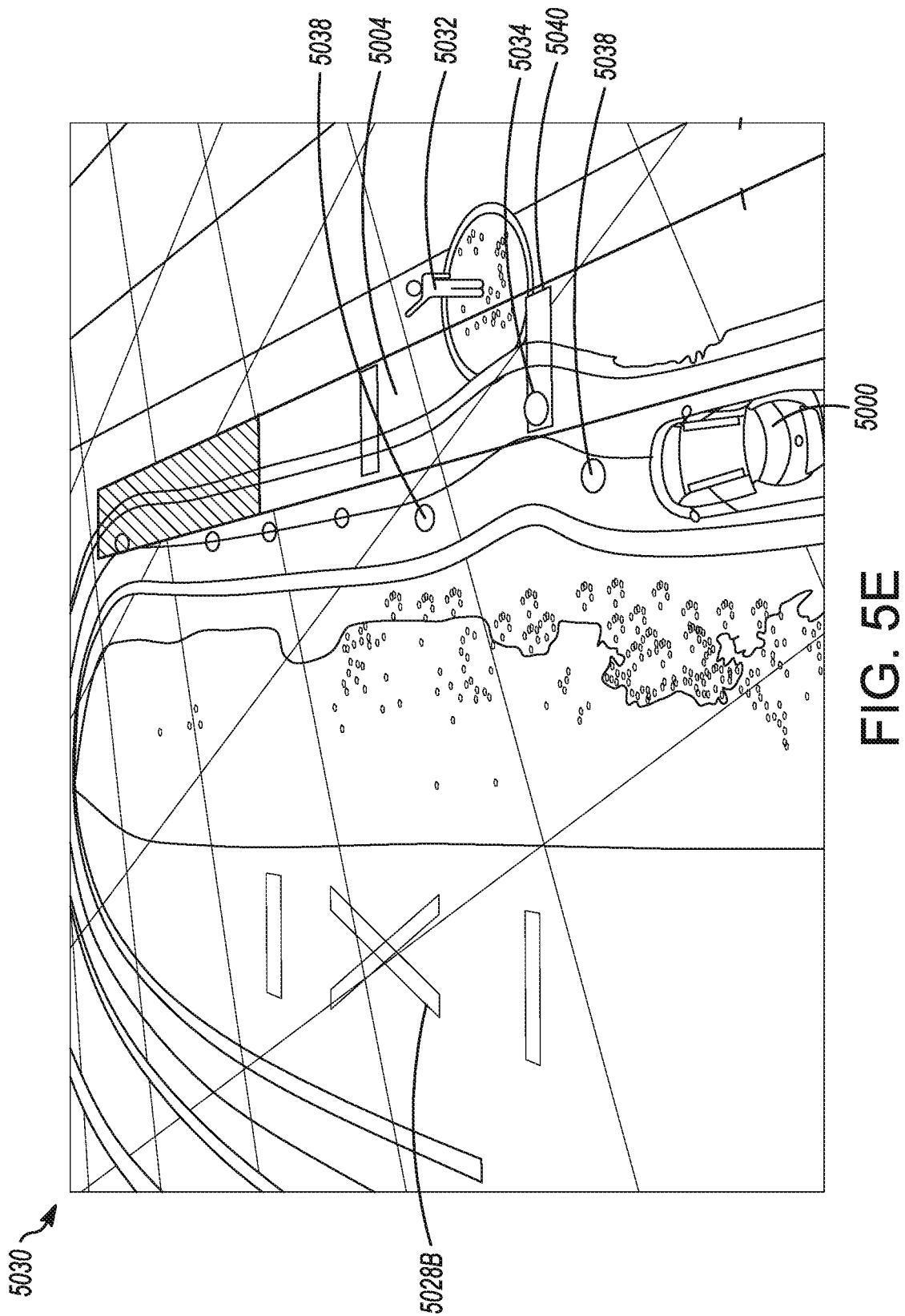
Figure 5F:
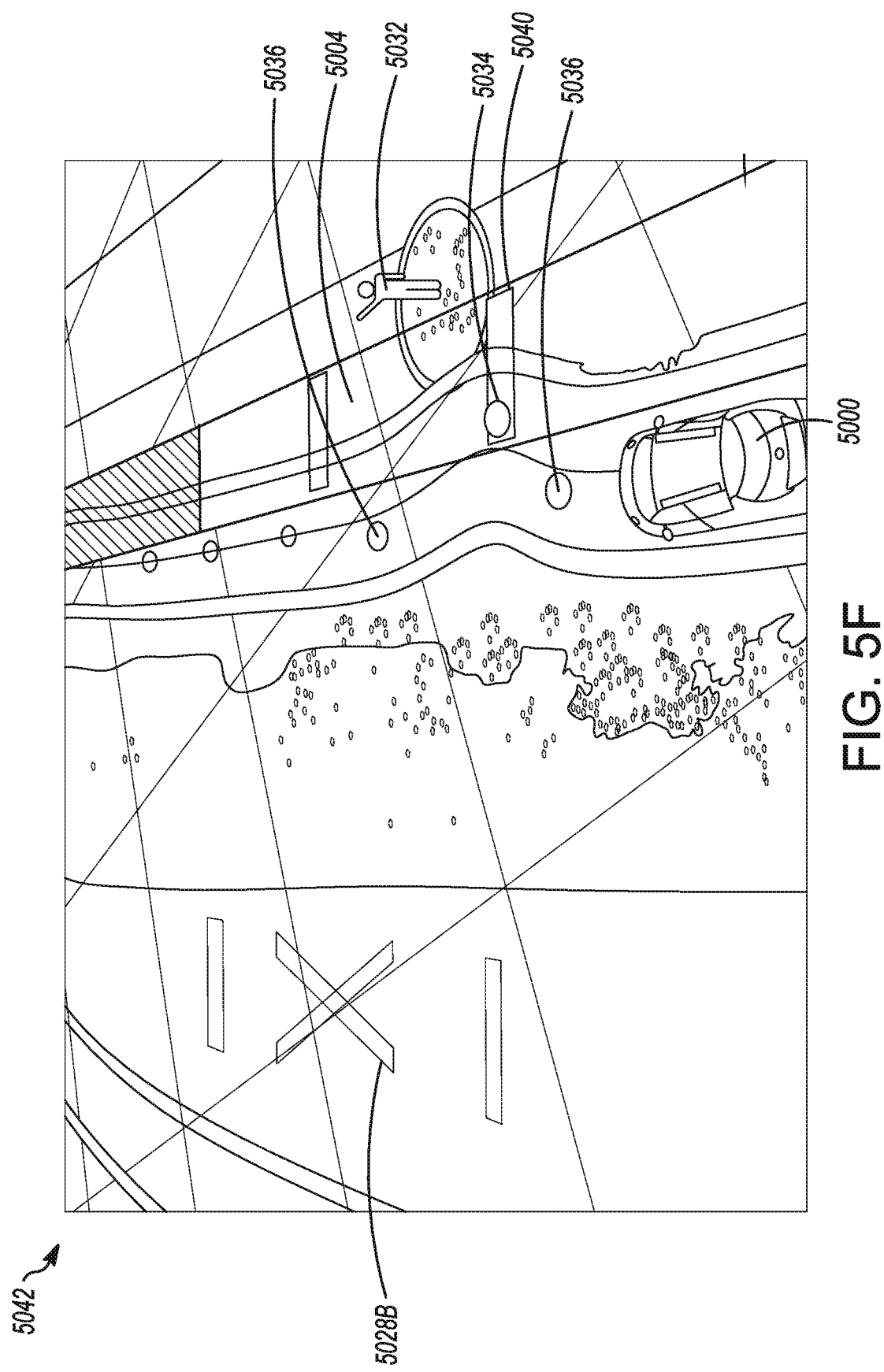

Using the remote support interface, instruction data may be generated for the vehicle to deviate from the existing route. More specifically, one or more input signals may be provided to the remote support interface to generate instruction data for the vehicle. This may be illustrated by FIGS. 5E and 5F, and by FIGS. 6D-6H. In FIGS. 5E and 5F, georeferenced high resolution satellite images 5030, 5042 are shown with the vehicle 5000 and an icon 5032 representing the passenger to be picked up superimposed on the images 5030, 5042. In this example, after the assistance request signal is received, a vehicle 5006B to the right and front of the vehicle 5000 requesting the support moves (i.e., the vehicle 5006B shown in the camera view 5018 in FIG. 5D). According to the existing route, the vehicle 5000 is still blocked by the vehicle 5006A. An extended route may be generated by an operator providing input signals in the form of new navigation points 5036 that define an alternative end point 5034 at the destination 5004. FIGS. 5E and 5F show at least first and second navigation points 5036 of the extended route that modifies the path of the existing route shown in FIG. 5D. The end point may be indicated by desired stop position near the alternative end point 5034 that is generated as part of the extended route 5038. For example, and as shown in each of these figures, the input signal forms the desired stop position at a cross line 5040 perpendicular to a path of the vehicle 5000 from a current position of the vehicle 5000 to the alternative end point 5034 on the display. Each of the navigation points 5036 may also be defined by a cross line to mark stop points along the extended route 5038.

Figure 6D:
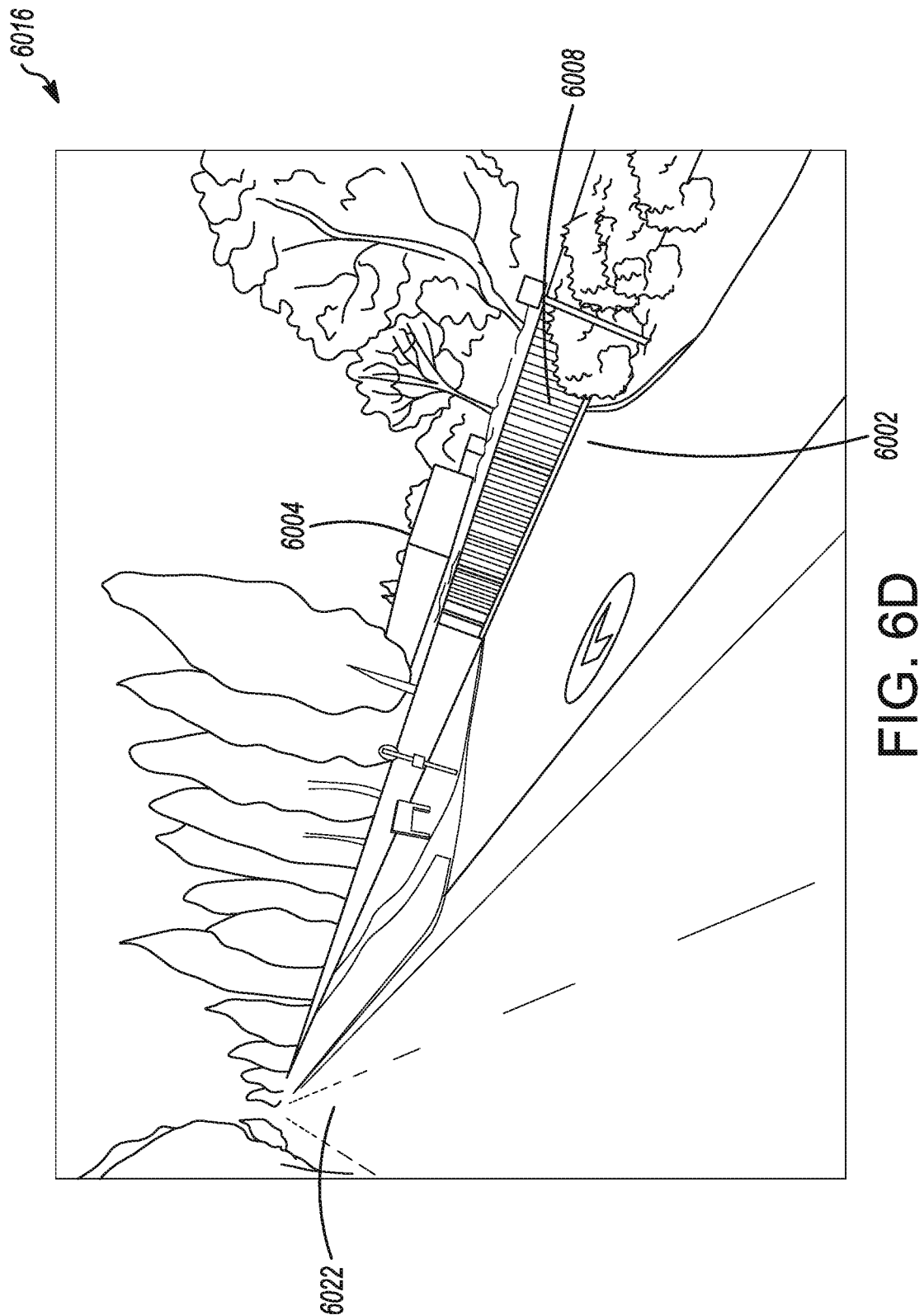
Figure 6E:
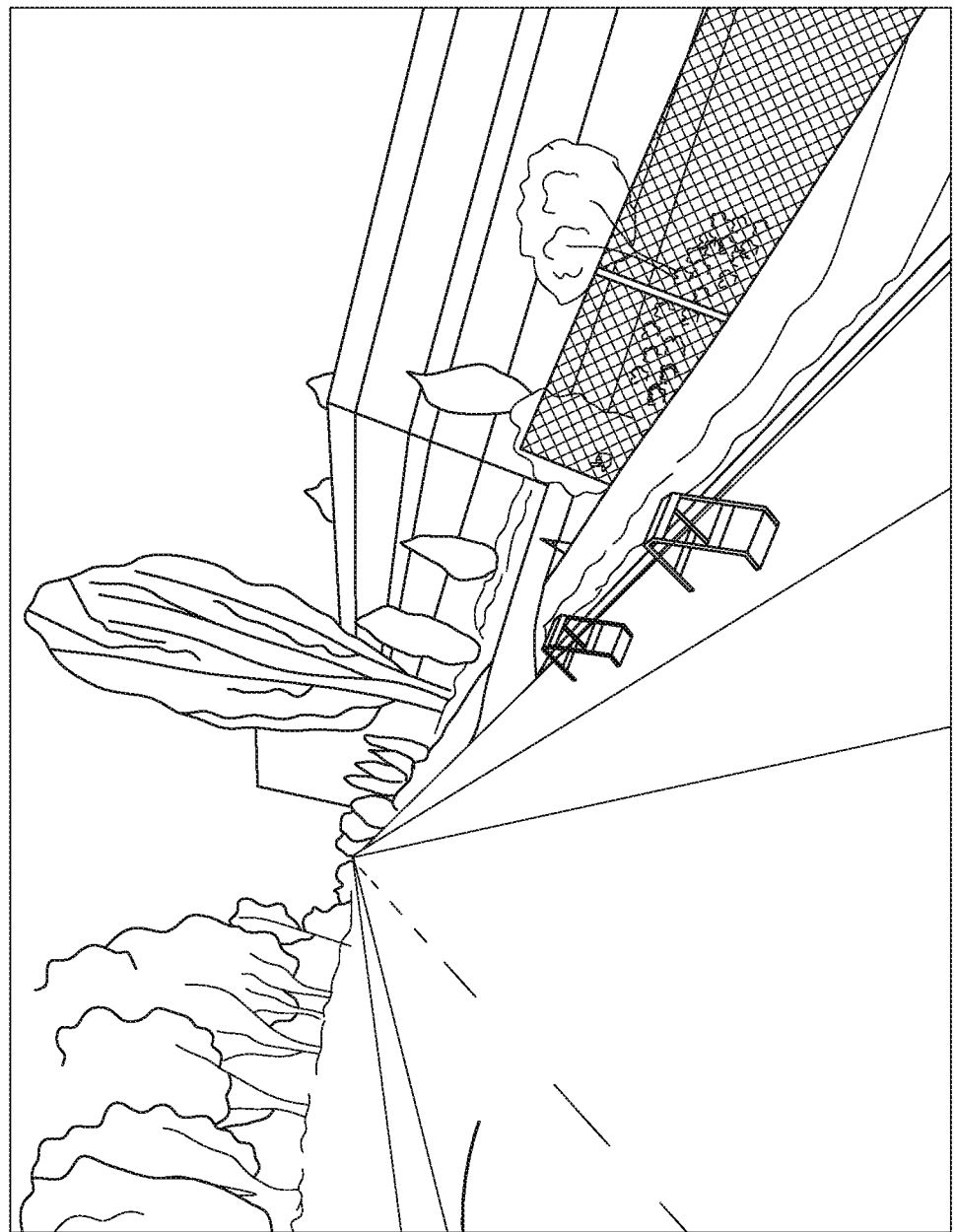
Figure 6F:
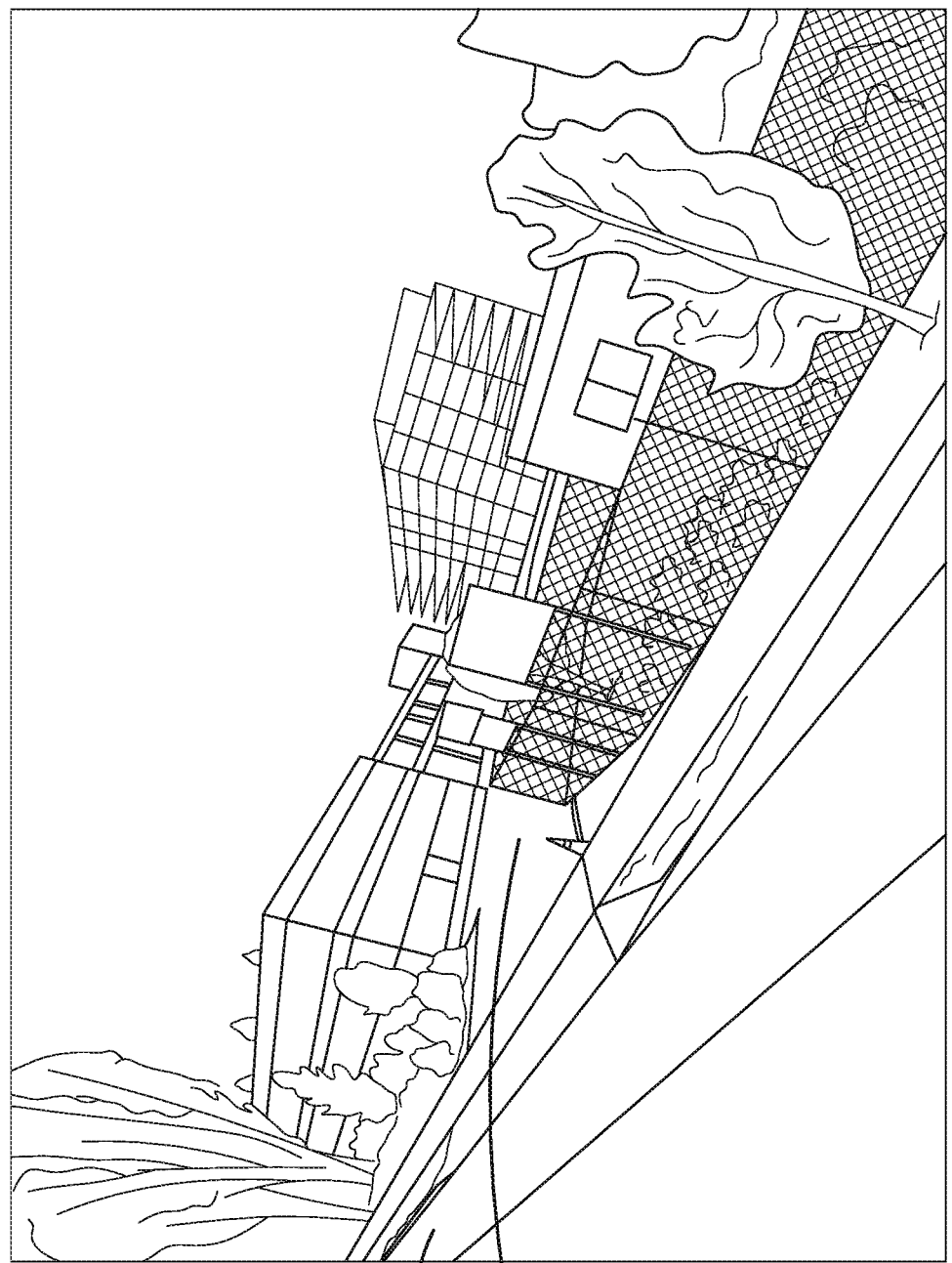
Figure 6G:
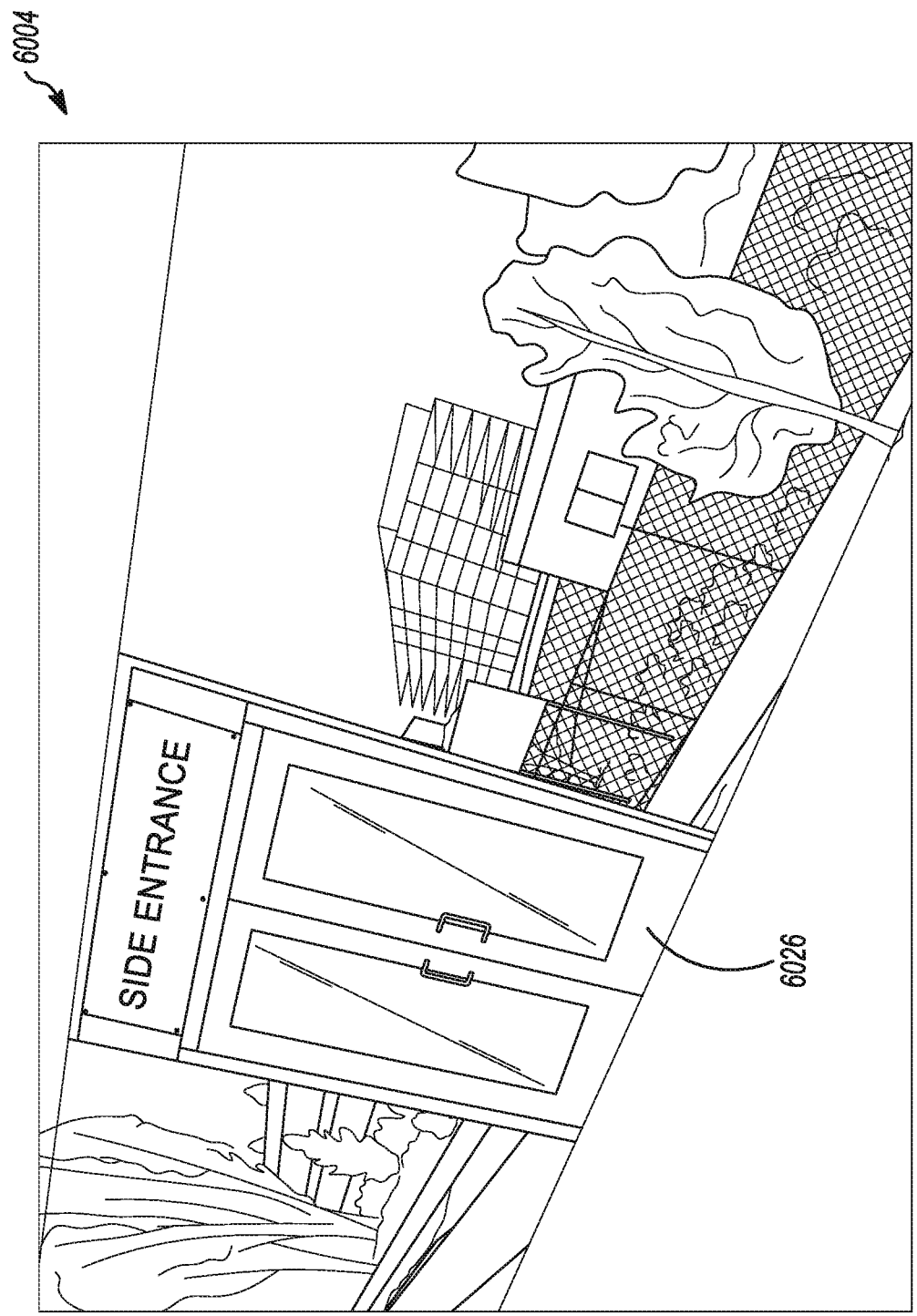

FIGS. 6D-6H illustrate alternative aspects of generating the extended route using one or more input signals. In FIGS. 6D-6G, the operator of the remote support interface adds street view data, such as publicly available street view data, to the remote support interface. This street view data is in the display images 6016, 6018, and 6020 shown in FIGS. 6D, 6E, and 6F, respectively. The images 6016, 6018, and 6020 are used to determine the alternative end point near a side entrance 6026 (see FIG. 6G) and an extended route to that alternative end point. The image 6016 in FIG. 6D shows a road 6022 upon which the vehicle 6000 will have to traverse after backing out of the entrance 6002. The image 6018 in FIG. 6E reflects travel further down the road 6022 from the entrance 6002. The image 6020 shows a path 6024 extending from the road 6022.

Figure 6H:
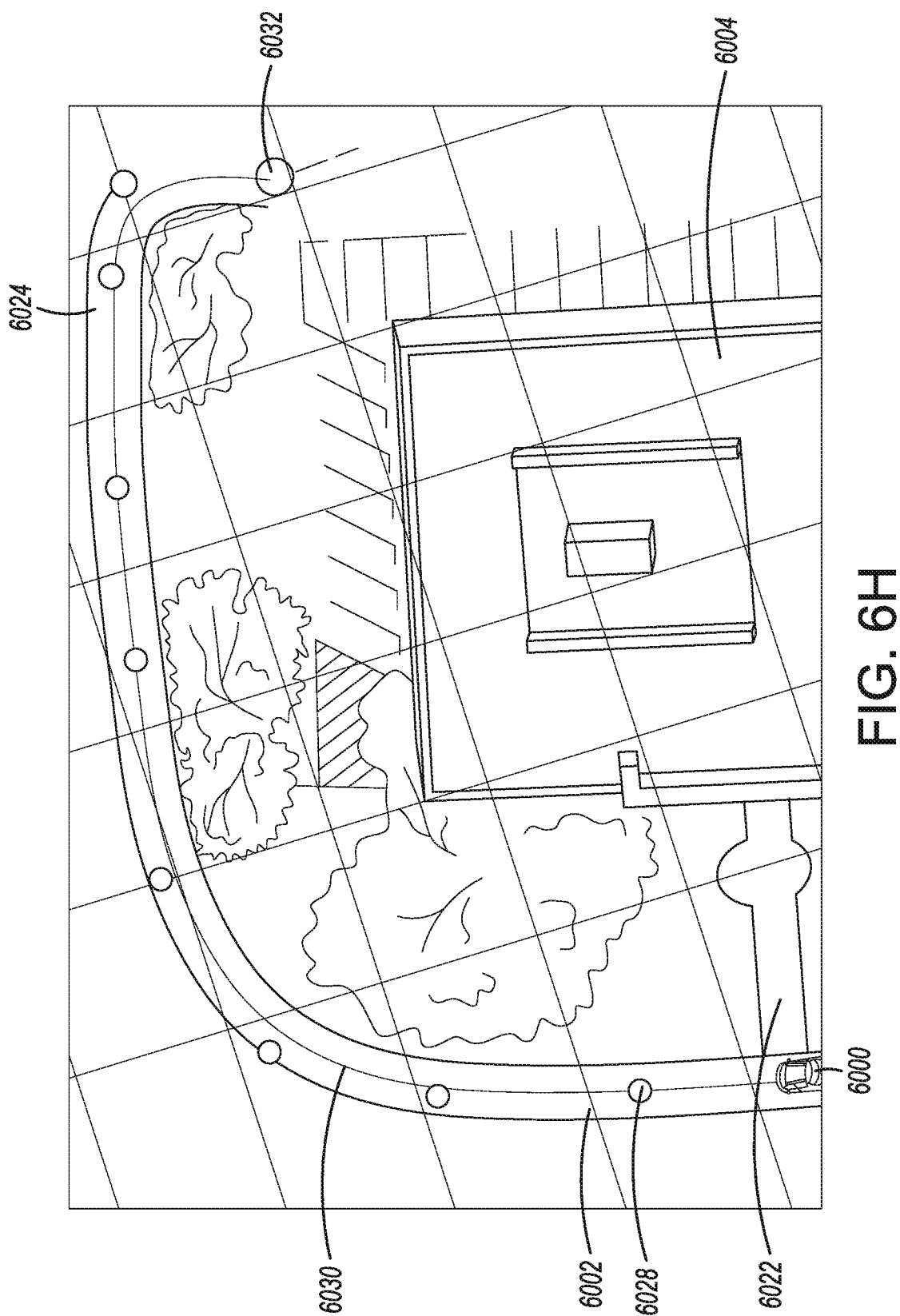

Once the remote support has the images 6016, 6018, and 6020, the extended route may be generated. As seen in FIG. 6H, the input signals may correspond to the points 6028 defined by the remote support that are located along the extended route 6030 to the alternative end point 6032 that is in the vicinity of the side entrance 6026. As can be seen from FIG. 6H, a portion of the extended route 6030 is within a mapped portion of the geographical area (i.e., the road 6022), while another portion of the extended route in within an unmapped portion of the geographical area (i.e., the path 6024). An extended route may also be referred to as an alternative driving route herein due to its end point being the alternative end point.

Figure 5G:
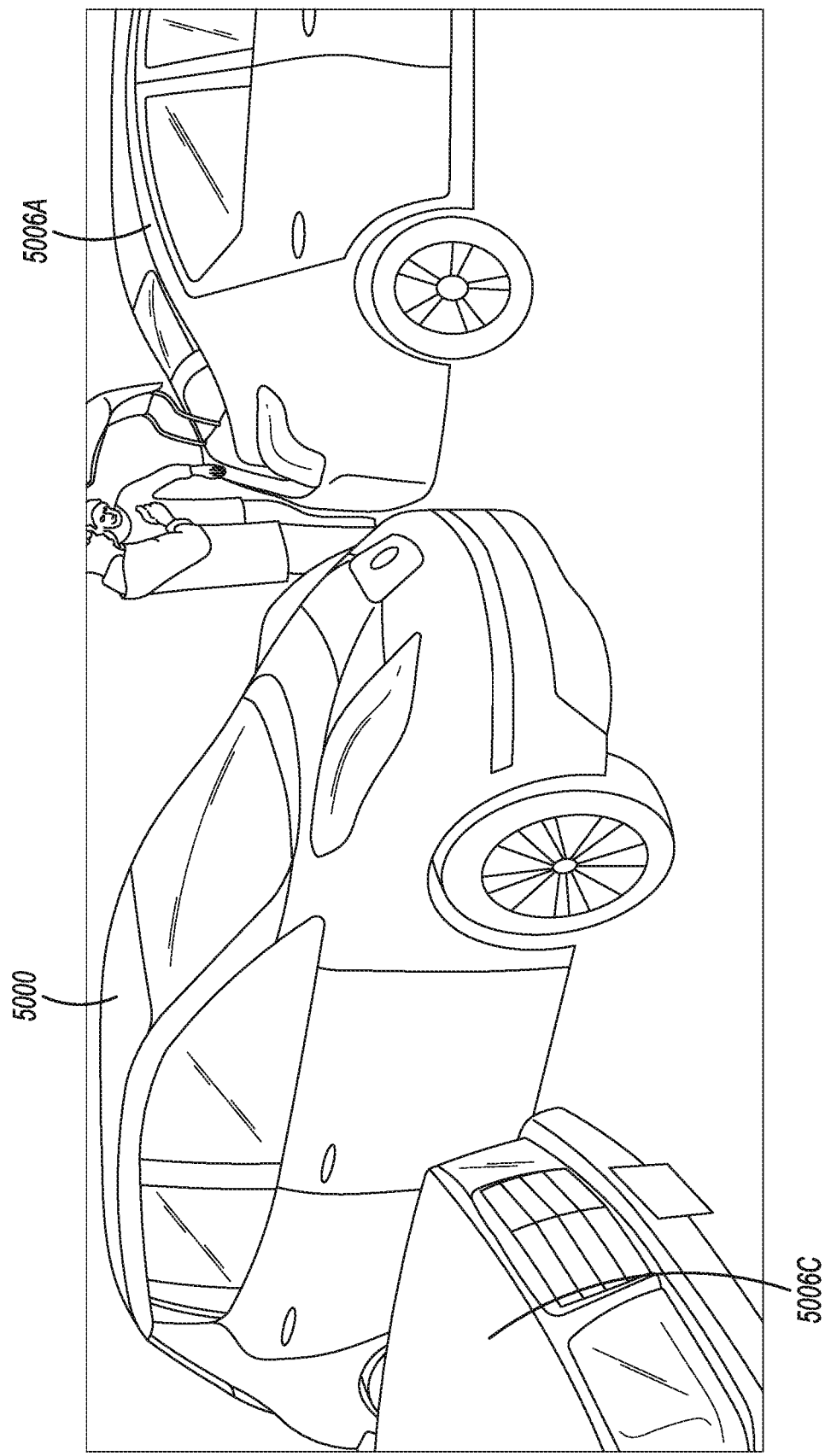

Responsive to an input signal provided to the remote support interface, instruction data is transmitted to the vehicle that includes an alternative end point at the destination. The vehicle can use the instruction data for autonomous operation of the vehicle. For example, the vehicle 5000 following the extended route that bypasses the vehicle 5006A to reach the alternative end point 5034 using the navigation points 5036A, 5036B is shown in FIG. 5G. In some examples, the operator selects the alternative end point, and the vehicle determines the extended route to the alternative end point without further assistance. The instruction data may comprise interim points between a current location of the vehicle and the alternative end point at which the vehicle is to stop.

In the examples of FIGS. 5A-5G and 6A-6H, the alternative end points are new end points. The new end point may be stored in a set of possible end points for the destination within memory. In some implementations, the input signal may be the selection of a previously stored end point of the possible end points. It is also possible that, where the alternative end point is within an unmapped portion of the geographical area, the instruction data includes an alternative driving route that includes a path through the unmapped portion to the alternative end point at the destination. When the alternative end point is a new end point, the path may be stored in association with the new end point. The path to the alternative end point may be based on at least one of a service context, a customer location, the end point at the destination, local traffic rules or norms, a stored history of the destination, or any combination thereof.

The disclosed technology provides support for remote operation of a vehicle when barriers to reaching a desired end point exist. The flow of the autonomous vehicles through a particular transportation network is enhanced, which improves the utilization of available transportation resources, increases passenger safety, and improves on-time arrival of passengers and cargo.

As used herein, the terminology "driver" or "operator" may be used interchangeably. As used herein, the terminology "brake" or "decelerate" may be used interchangeably. As used herein, the terminology "computer" or "computing device" includes any unit, or combination of units, capable of performing any method, or any portion or portions thereof, disclosed herein.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some implementations, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example," "embodiment," "implementation," "aspect," "feature," or "element" indicate serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or." That is, unless specified otherwise, or clear from context, "X includes A or B" is intended to indicate any of the natural inclusive permutations. If X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

While the disclosed technology has been described in connection with certain embodiments, it is to be understood that the disclosed technology is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus for remote support of autonomous operation of a vehicle, the apparatus comprising:
   a memory; and
   a processor configured to execute instructions stored in the memory to:

receive, from a vehicle traversing a driving route from a start point to an end point at a destination, an assistance request signal identifying an inability of the vehicle stopped at the destination to reach the end point;

generate a first map display including a representation of a geographical area and the vehicle within the geographical area;

receive, from the vehicle, sensor data from one or more sensing devices of the vehicle;

generate a remote support interface including the first map display, the sensor data, and a georeferenced high resolution satellite image;

receive an input signal on the first map display indicating a desired stop position near an alternative end point at the destination, the input signal forming a cross line perpendicular to a path of the vehicle from a current position of the vehicle to the alternative end point on the first map display, and the input signal responsive to the sensor data; and transmit instruction data to the vehicle that includes the alternative end point at the destination responsive to the input signal provided to the remote support interface, wherein the instruction data comprises interim points between a current location of the vehicle and the alternative end point that form an extended driving route, at least a portion of the extended driving route located in an unmapped portion of the geographical area, and wherein the instruction data comprises transmitting the desired stop position to the vehicle as the alternative end point.

2. The apparatus of claim 1, wherein the sensor data comprises at least one of image data from an image capture device of the vehicle or object detection information.

3. The apparatus of claim 1, wherein the memory comprises storage that stores at least two end points at the destination.

4. The apparatus of claim 3, wherein the input signal comprises a selection of the alternative end point from the at least two end points.

5. The apparatus of claim 4, wherein the alternative end point is within the unmapped portion of the geographical area, and the input signal further comprises the extended driving route from a mapped portion of the geographical area through the unmapped portion of the geographical area to the alternative end point.

6. The apparatus of claim 1, wherein the alternative end point is a new end point within a mapped portion of the geographical area.

7. The apparatus of claim 6, wherein the processor is configured to execute instructions stored in the memory to:
store the new end point in a set of possible end points for the destination.

8. The apparatus of claim 1, wherein the alternative end point is a new end point in the unmapped portion of the geographical area, and the extended driving route includes a path through the unmapped portion to the new end point at the destination.

9. The apparatus of claim 8, wherein the processor is configured to execute instructions stored in the memory to:
store the new end point in a set of possible end points for the destination; and
store the path through the unmapped portion to the new end point.

10. The apparatus of claim 1, wherein the remote support interface includes publicly-available street view data.

11. The apparatus of claim 1, wherein the assistance request signal comprises an automated signal from the vehicle responsive to the vehicle stopping for a defined time within a defined distance of the destination.

12. The apparatus of claim 1, wherein the assistance request signal is responsive to at least one of a closed entrance at the destination between a current location of the vehicle and the end point, or a closed sidewalk at the destination between the current location of the vehicle and the end point.

13. A method for providing remote support of autonomous operation of a vehicle, the method comprising:
receiving, from a vehicle traversing a driving route from a start point to a destination, an assistance request signal identifying an inability of the vehicle stopped at the destination to reach an end point at the destination;

generating, responsive to receiving the assistance request signal, a first map display including a representation of a geographical area and the vehicle within the geographical area;

receiving, from the vehicle, sensor data from one or more sensing devices of the vehicle;

generating, responsive to receiving the assistance request signal, a remote support interface including the first map display, the sensor data, and a georeferenced high resolution satellite image, wherein the georeferenced high resolution satellite image encompasses the end point and an alternative end point at the destination, the first map display and the georeferenced high resolution satellite image are displayed separately on the remote support interface, and a representation of the vehicle is shown on the georeferenced high resolution satellite image at the destination where the vehicle is stopped;

forming a cross line perpendicular to a path of the vehicle from a current position of the vehicle to the alternative end point on the first map display, the cross line representing a desired stop position near the alternative end point; and transmitting instruction data to the vehicle that includes the alternative end point at the destination responsive to an input signal provided to the remote support interface, wherein the instruction data comprises interim points between a current location of the vehicle and the alternative end point that form an extended driving route, at least a portion of the extended driving route located in an unmapped portion of the geographical area, and wherein transmitting the instruction data comprises transmitting the desired stop position to the vehicle as the alternative end point.

14. The method of claim 13, wherein the instruction data comprises at least one of a stop position along the extended driving route, or one or more speed limits along the extended driving route.

15. The method of claim 13, wherein the extended driving route to the alternative end point is based on at least one of a service context, a customer location, the end point at the destination, local traffic rules or norms, or a stored history of the destination.

16. The method of claim 13, wherein the remote support interface comprises at least one of data from infrastructure sensor devices, or local rules or norms overlaying the first map display.

17. The method of claim 13, comprising:
overlaying markings on the georeferenced satellite image indicating local rules or norms.

18. The method of claim 17, comprising:
indicating, on the first map display of the remote support interface, a pop-up notification of receipt of the assistance request signal.

* * * * *